United States Patent
Sandberg et al.

(10) Patent No.: US 12,423,245 B2
(45) Date of Patent: Sep. 23, 2025

(54) ADDRESS TRANSLATION CIRCUITRY AND METHOD FOR PERFORMING ADDRESS TRANSLATIONS BASED ON PAGE TABLE LEVEL SIZE INFORMATION

(71) Applicant: Arm Limited, Cambridge (GB)

(72) Inventors: Andreas Lars Sandberg, Cambridge (GB); Ilias Vougioukas, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/294,668

(22) PCT Filed: Jul. 21, 2022

(86) PCT No.: PCT/EP2022/070494
§ 371 (c)(1),
(2) Date: Feb. 2, 2024

(87) PCT Pub. No.: WO2023/016770
PCT Pub. Date: Feb. 16, 2023

(65) Prior Publication Data
US 2024/0345962 A1    Oct. 17, 2024

(30) Foreign Application Priority Data
Aug. 13, 2021 (EP) .................... 21386053

(51) Int. Cl.
*G06F 12/1009*    (2016.01)

(52) U.S. Cl.
CPC .... *G06F 12/1009* (2013.01); *G06F 2212/651* (2013.01)

(58) Field of Classification Search
CPC ................ G06F 12/1009; G06F 2212/651
See application file for complete search history.

(56) References Cited

U.S. PATENT DOCUMENTS

| 2006/0236063 A1 | 10/2006 | Hausauer |
| 2014/0013073 A1 | 1/2014 | Gheith et al. |

(Continued)

OTHER PUBLICATIONS

International Search Report for International Application No. PCT/EP2022/070494 dated Nov. 4, 2022.

(Continued)

*Primary Examiner* — Chie Yew
(74) *Attorney, Agent, or Firm* — NIXON & VANDERHYE P.C.

(57) ABSTRACT

There is provided address translation circuitry and a method for performing address translation. The address translation circuitry is responsive to receipt of a first address to perform an address translation between the first address and a second address by performing a predetermined maximum number of sequential lookups. The address translation circuitry is configured to support regular page tables comprising 2N entries and large page tables comprising 2N*M entries. The address translation circuitry is configured to: perform an intermediate lookup to retrieve information indicative of a sequentially next lookup address and page table size information and, when the page table size information indicates that the sequentially next lookup corresponds to one of the large page table and performing the sequentially next lookup would exceed the predetermined maximum number of sequential lookups, suppress subsequent lookups and generate the second address based on the information indicative of the sequentially next lookup address.

15 Claims, 14 Drawing Sheets

(56) References Cited

U.S. PATENT DOCUMENTS

Figure 1:
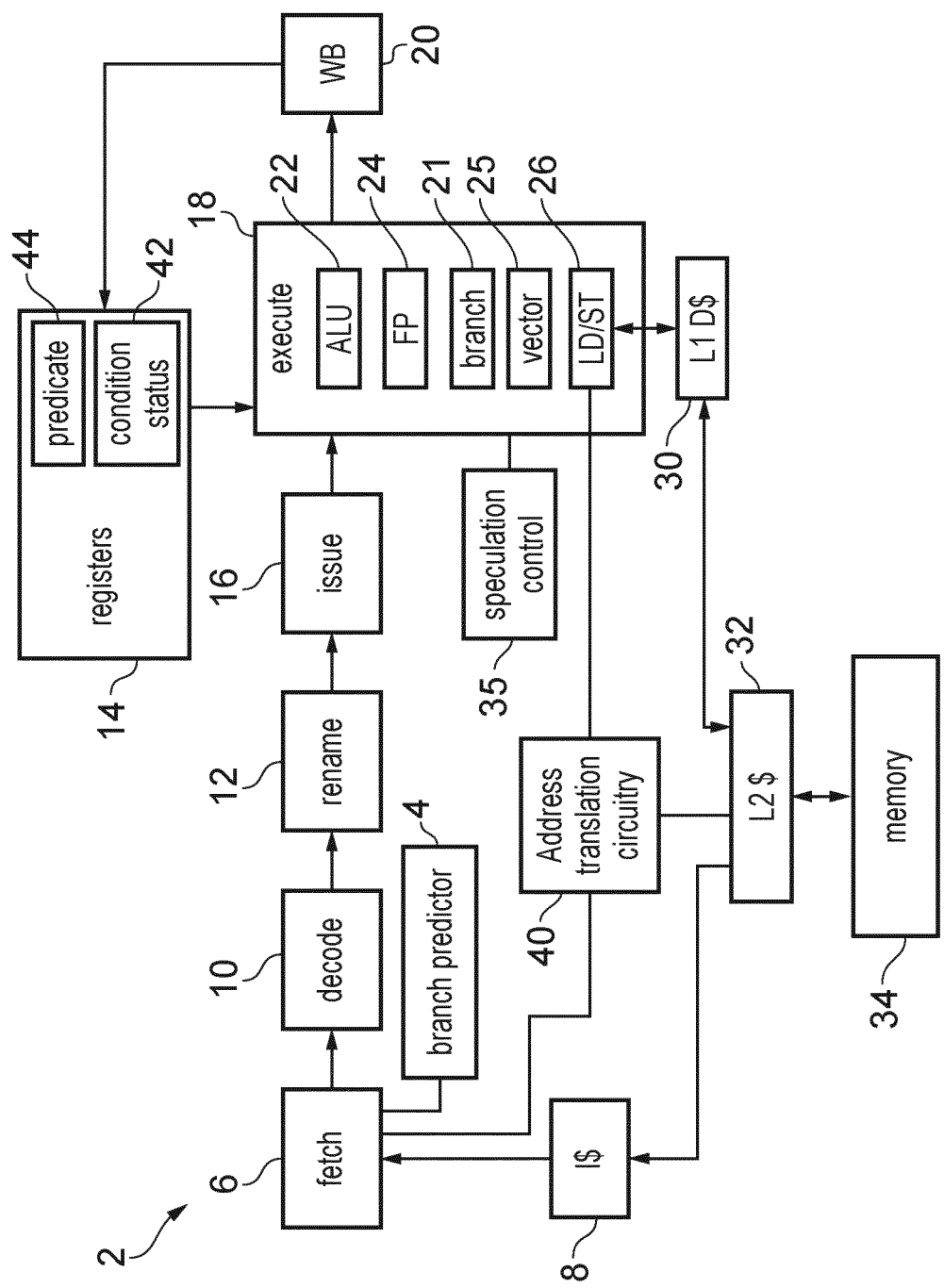

2016/0378683 A1* 12/2016 Seiler ................. G06F 12/1009
　　　　　　　　　　　　　　　　　　　　　　711/170
2018/0300253 A1* 10/2018 Smith ................. G06F 12/1009

OTHER PUBLICATIONS

Park et al., "Page Tables: Keeping them Flat and Hot (Cached)," Dec. 9, 2020.

* cited by examiner

ADDRESS TRANSLATION CIRCUITRY AND METHOD FOR PERFORMING ADDRESS TRANSLATIONS BASED ON PAGE TABLE LEVEL SIZE INFORMATION This invention relates to address translation circuitry and a method for performing address translations.

Address translation circuitry is used to translate from a first address to a second address using a predetermined number of sequential lookups in a plurality of page table levels. Performing each of the predetermined number of lookups can be time consuming resulting in latencies in address translation.

In some configurations there is provided address translation circuitry responsive to receipt of a first address to perform an address translation between the first address and a second address by performing a predetermined maximum number of sequential lookups in a plurality of page table levels, wherein the address translation circuitry is configured to:
support regular page table levels comprising $2^N$ entries and large page table levels comprising $2^{N*M}$ entries, wherein each sequential lookup in a regular page table level is deemed to be a single level lookup of the predetermined maximum number of sequential lookups and each sequential lookup in a large page table level is deemed to be M level lookups of the predetermined maximum number of sequential lookups; and
perform an intermediate lookup to:
retrieve, from a current intermediate page table level of the plurality of page table levels, information indicative of a sequentially next lookup address of a sequentially next page table level and page table level size information indicative of a size of the sequentially next page table level; and
when the page table level size information indicates that the sequentially next lookup corresponds to one of the large page table levels and that performing the sequentially next lookup would exceed the predetermined maximum number of sequential lookups, suppress subsequent lookups of the predetermined maximum number of sequential lookups and generate the second address based on the information indicative of the sequentially next lookup address.

In some configurations there is provided method for performing, in response to receipt of a first address, an address translation between the first address and a second address by performing a predetermined maximum number of sequential lookups in a plurality of page table levels comprising regular page table levels comprising $2^N$ entries and large page table levels comprising $2^{N*M}$ entries, wherein each sequential lookup in a regular page table level is deemed to be a single lookup of the predetermined maximum number of sequential lookups and each sequential lookup in a large page table level is deemed to be M lookups of the predetermined maximum number of sequential lookups, the method comprising performing an intermediate lookup by:
retrieving from a current intermediate page table level of the plurality of page table levels, information indicative of a sequentially next lookup address of a sequentially next page table level and page table level size information indicative of a size of the sequentially next page table level; and
suppressing, when the page table level size information indicates that the sequentially next lookup corresponds to one of the large page table levels and that performing the sequentially next lookup would exceed the predetermined maximum number of sequential lookups, subsequent lookups of the predetermined maximum number of sequential lookups and generate the second address based on the information indicative of the sequentially next lookup address.

Figure 2:
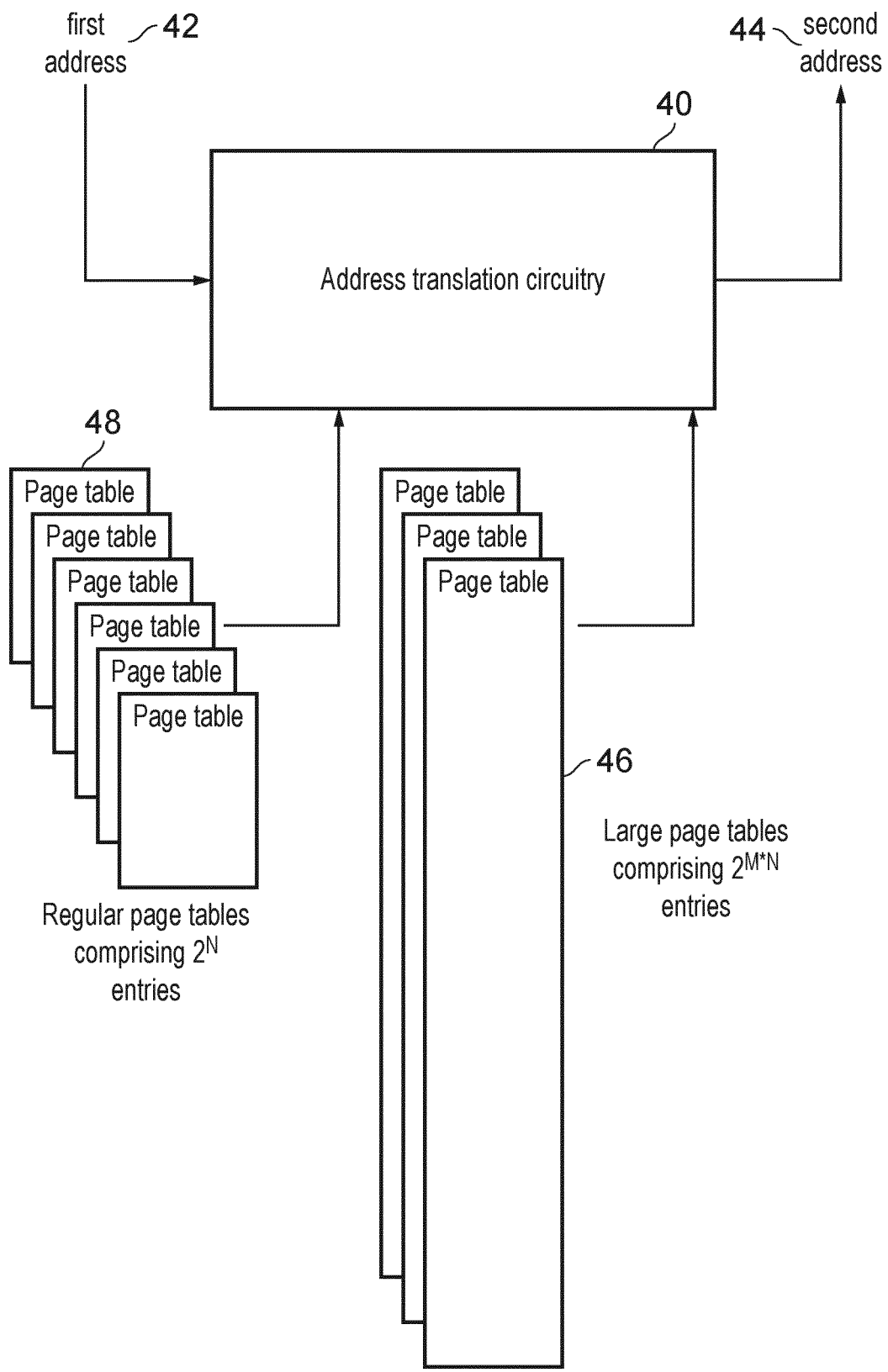
Figure 3:
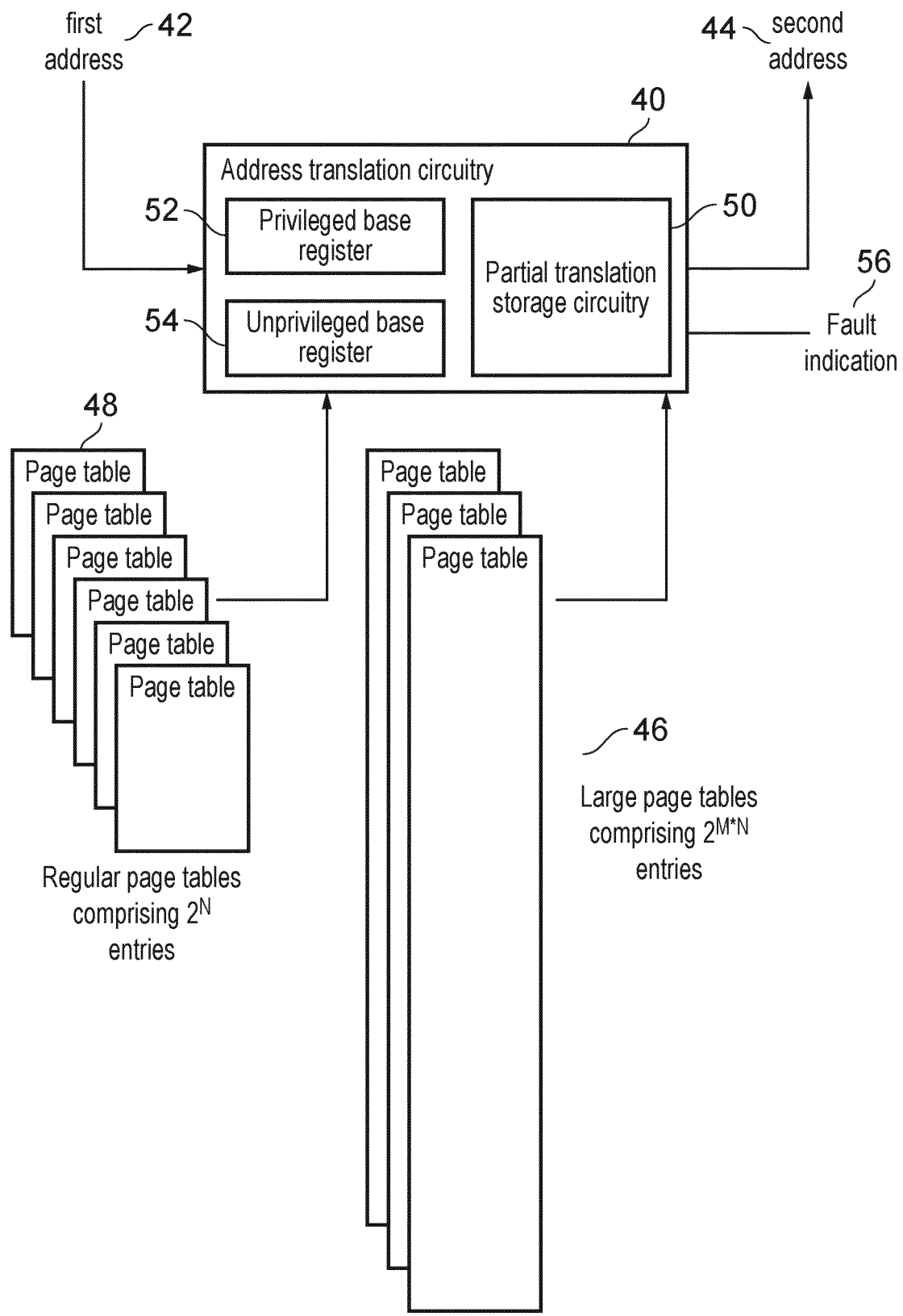
Figure 4:
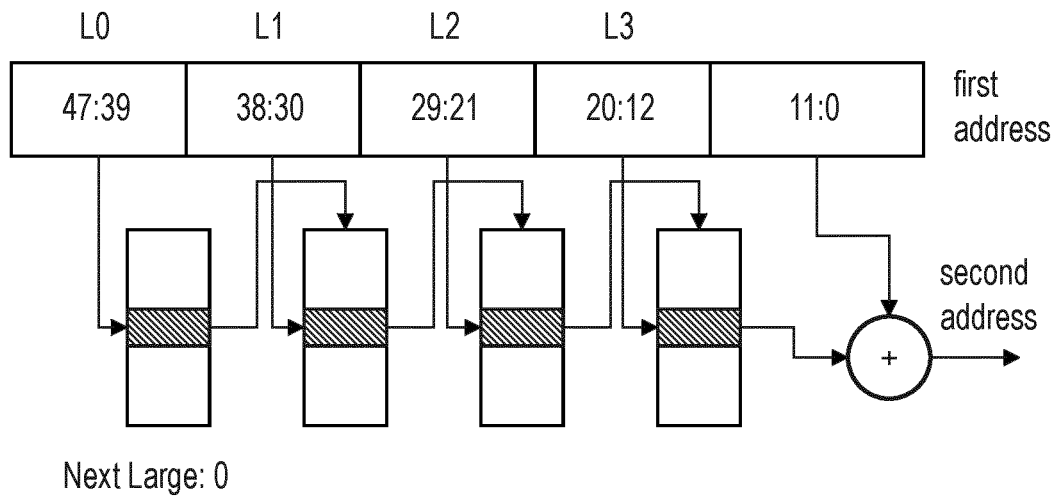
Figure 5:
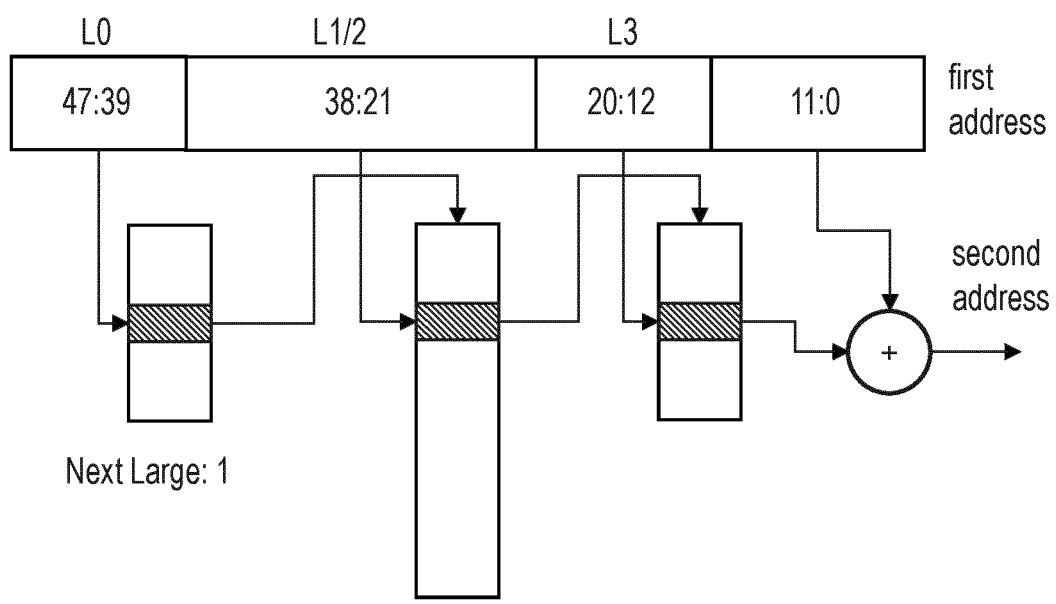
Figure 6:
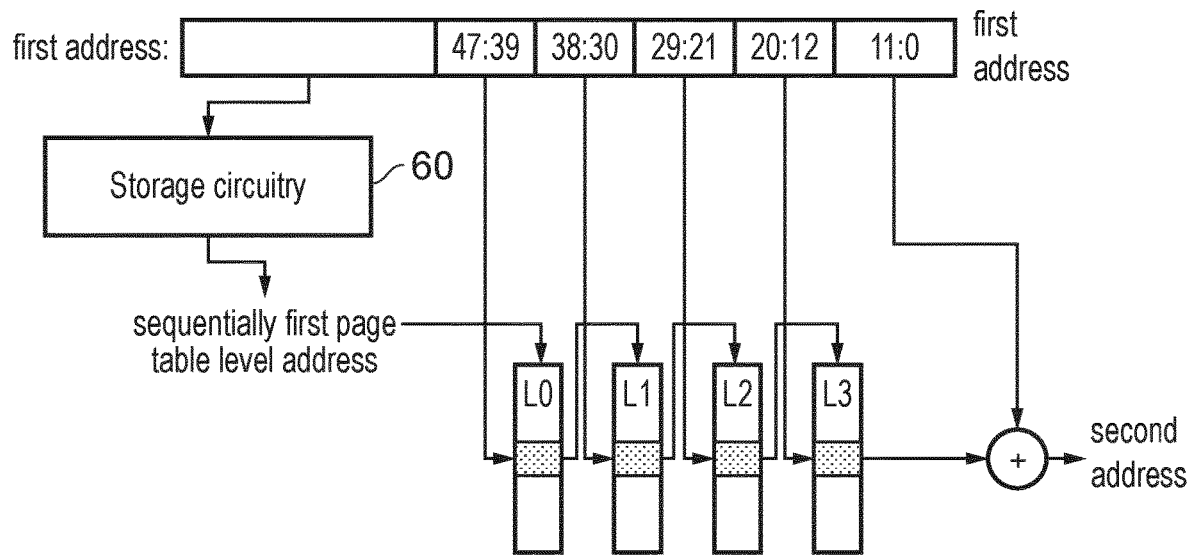
Figure 7:
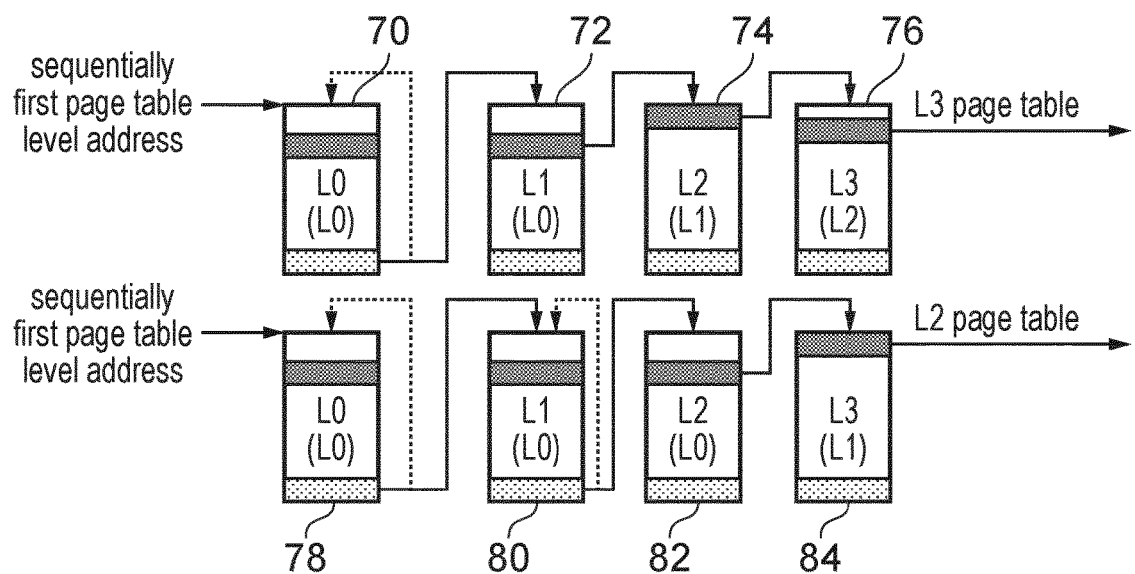
Figure 8A:
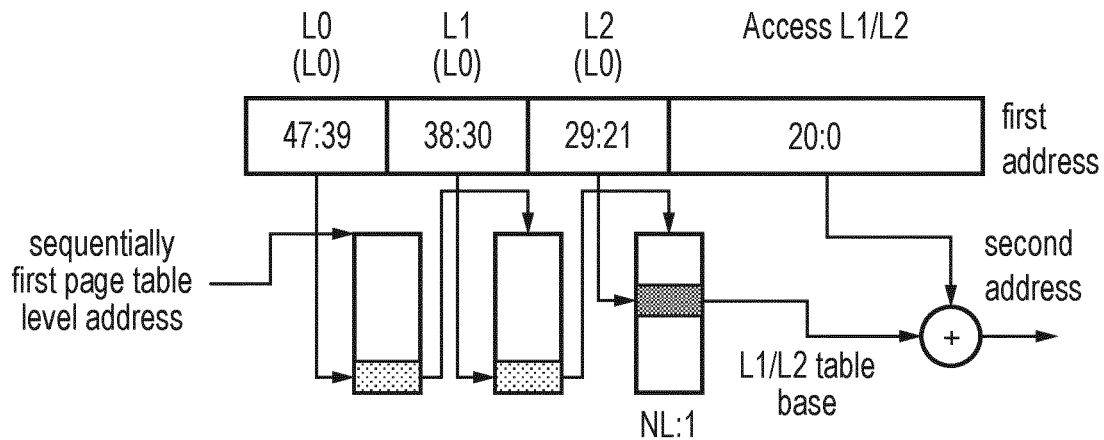
Figure 8B:
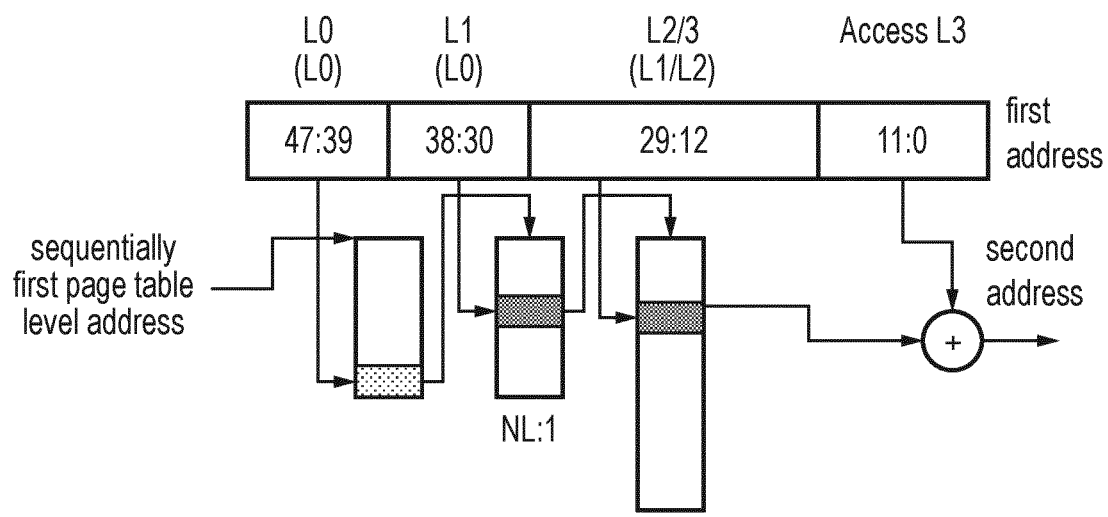
Figure 9A:
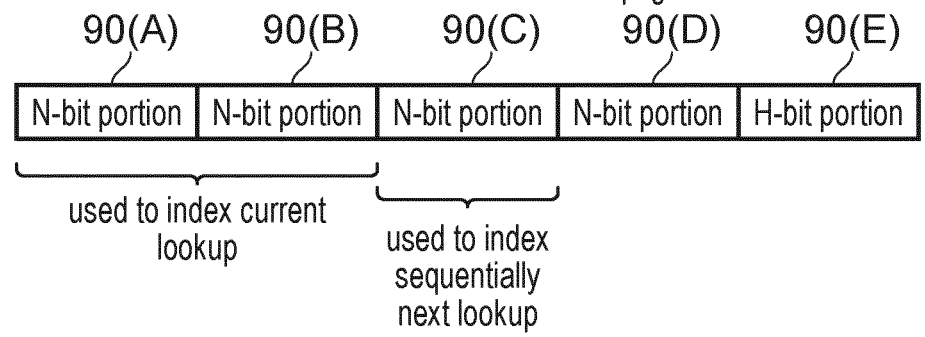
Figure 9B:
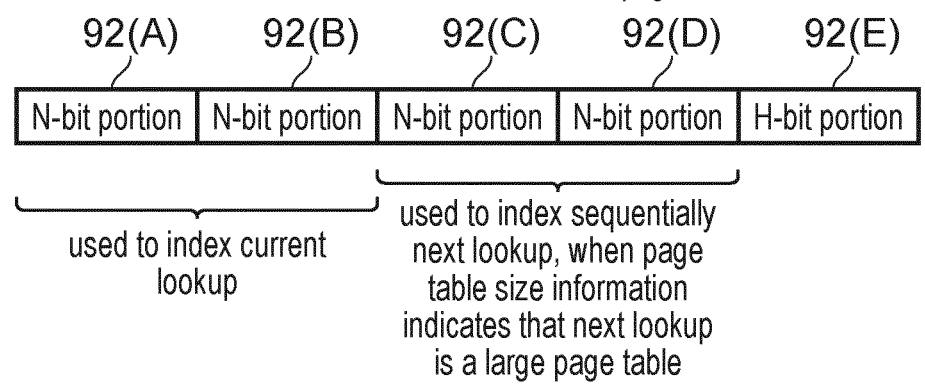
Figure 9C:
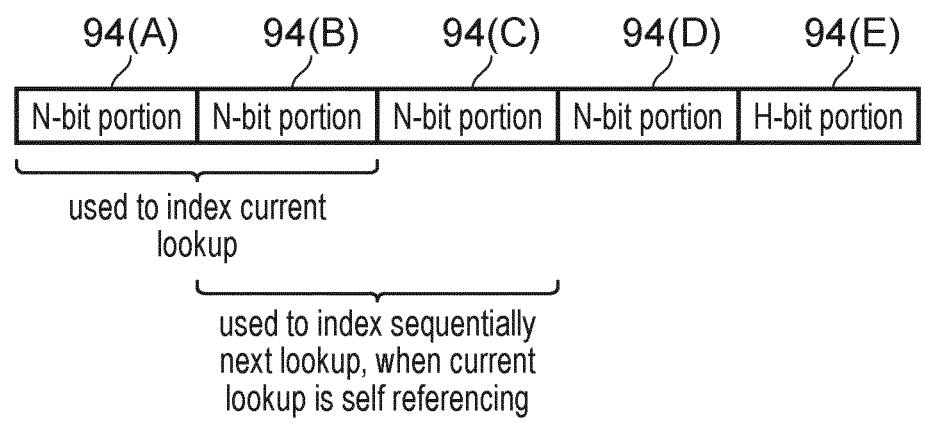
Figure 10A:
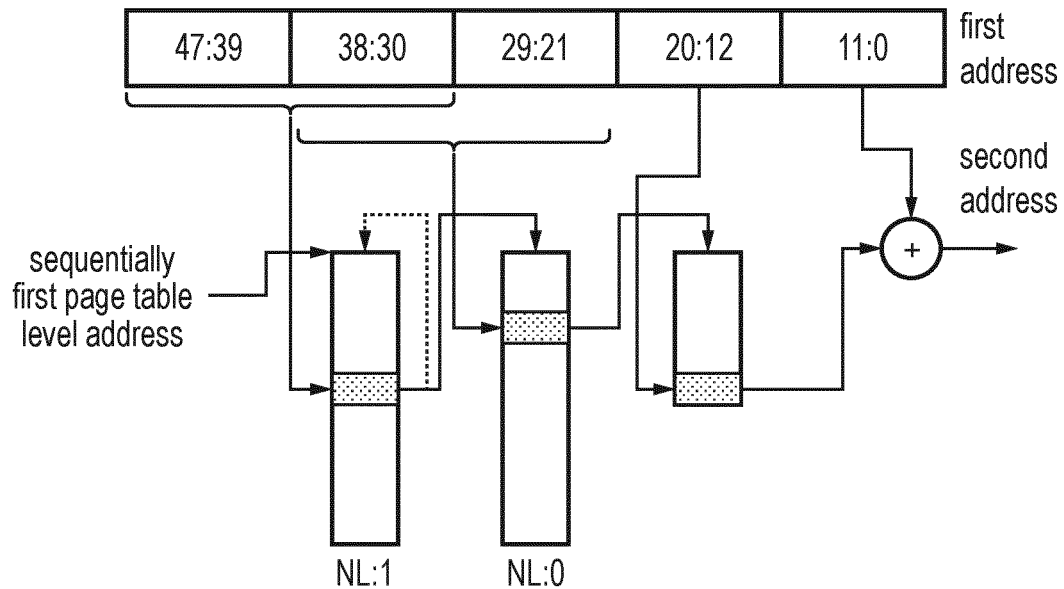
Figure 10B:
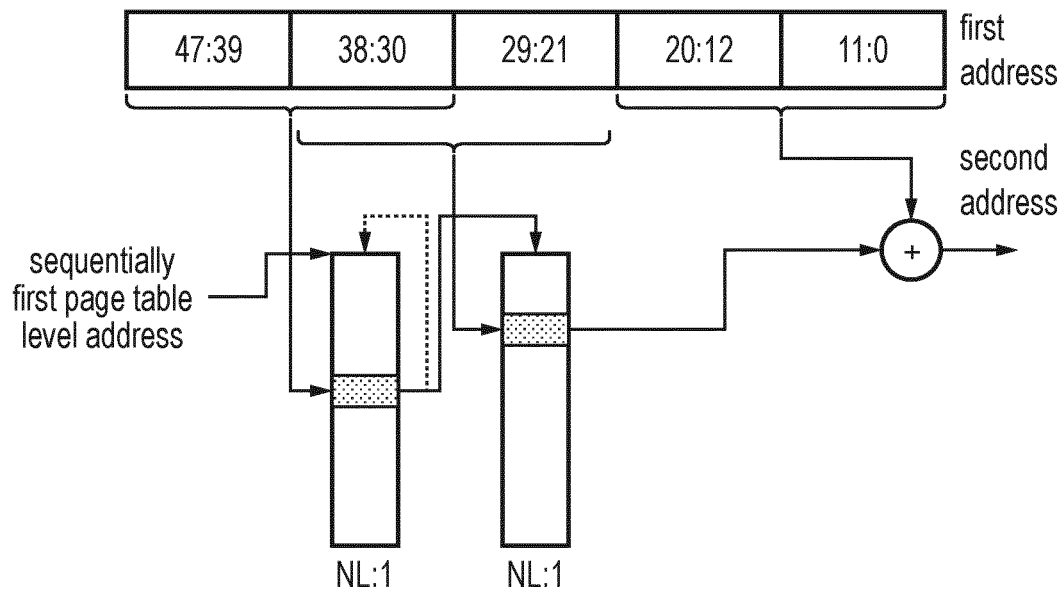
Figure 10C:
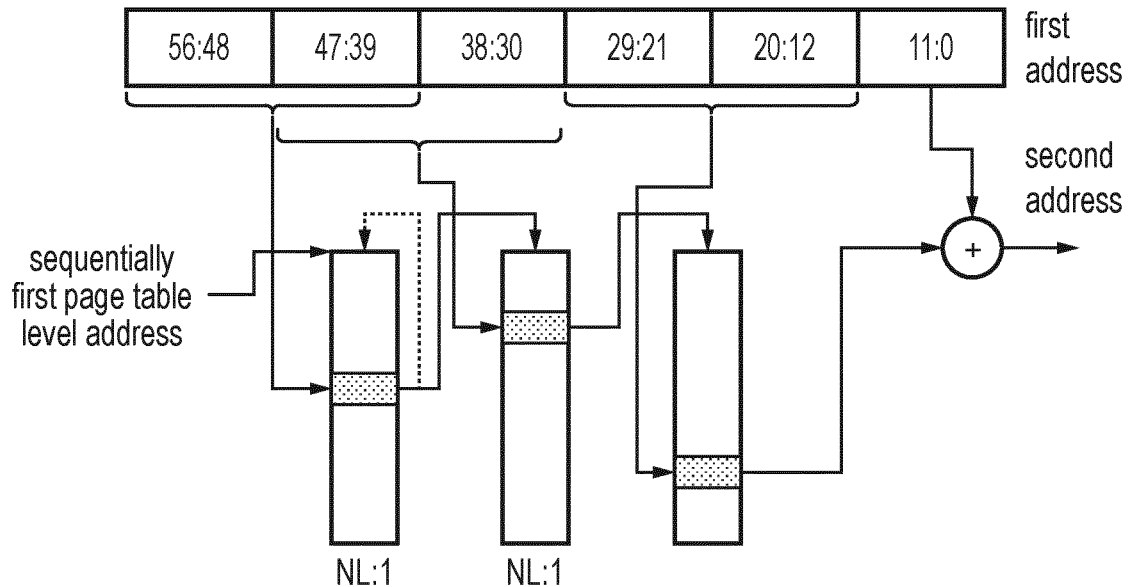
Figure 10D:
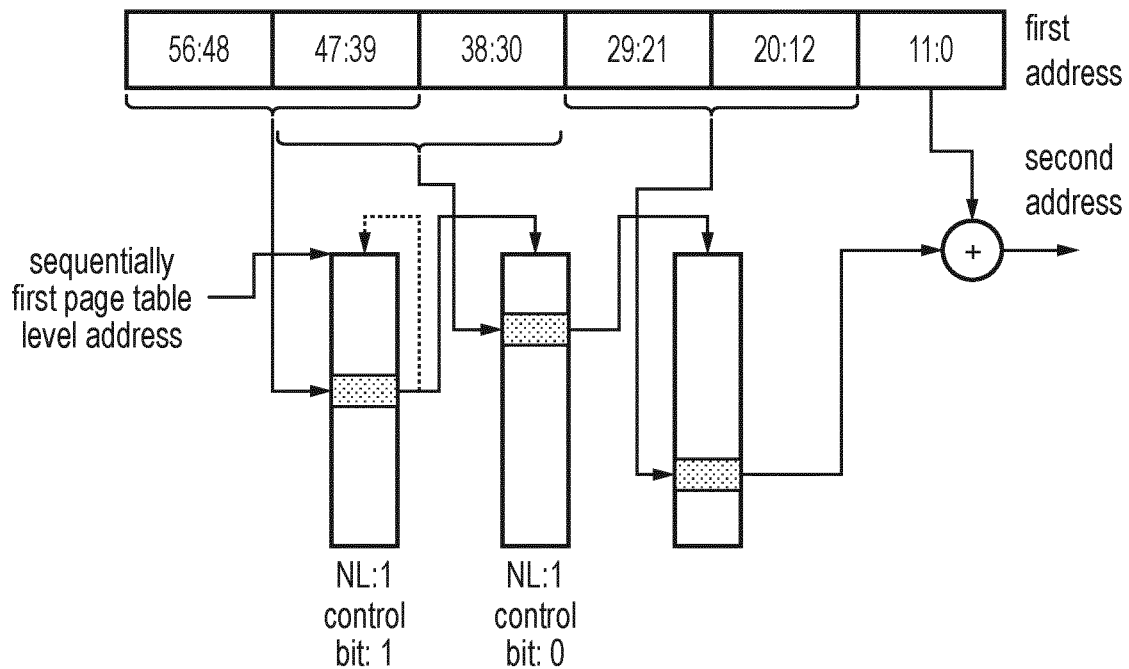
Figure 11:
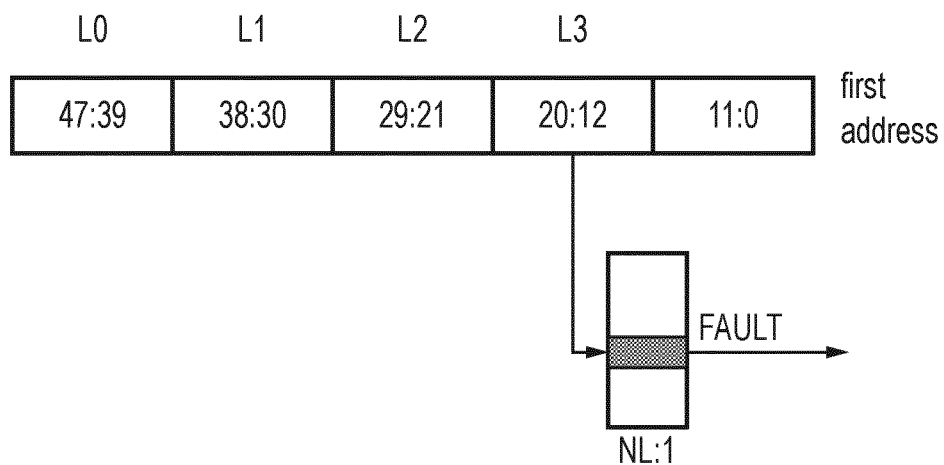
Figure 12:
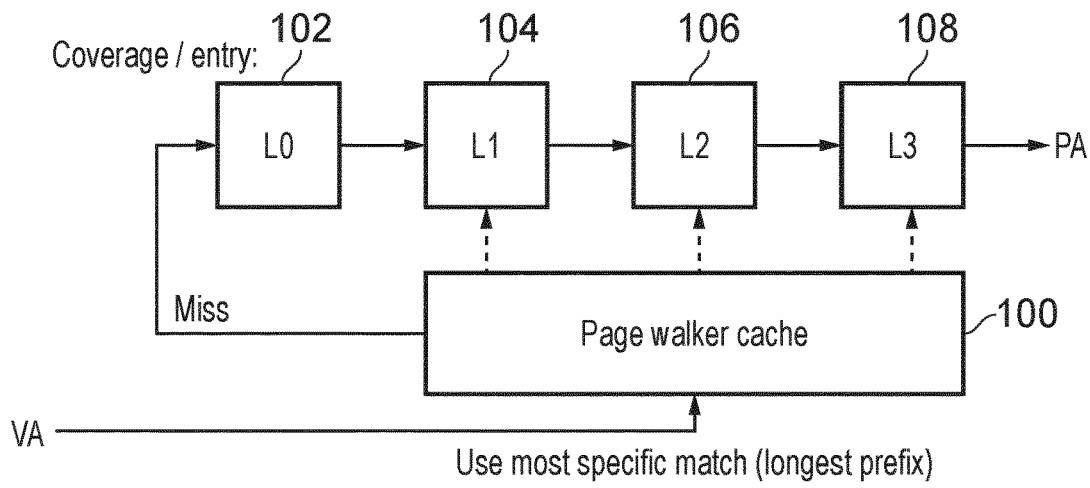
Figure 13:
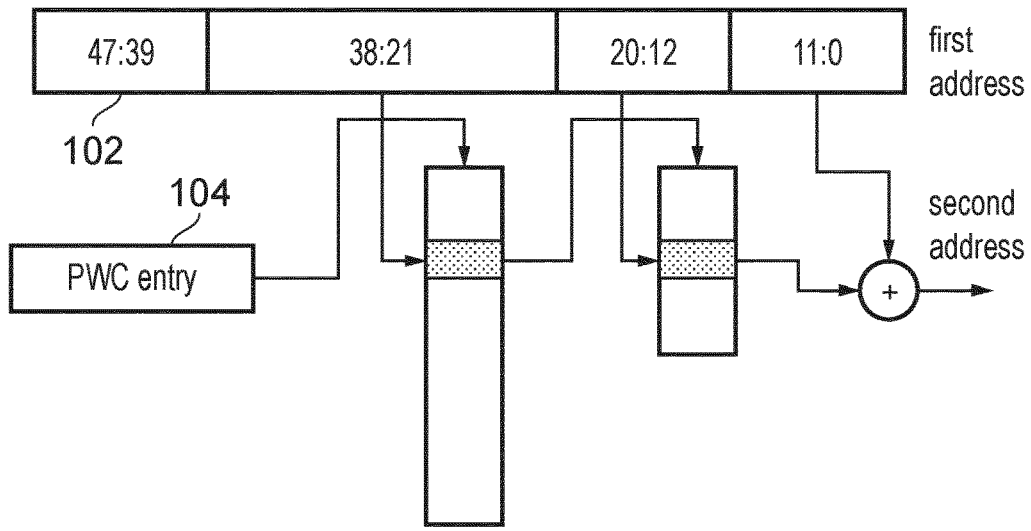
Figure 14:
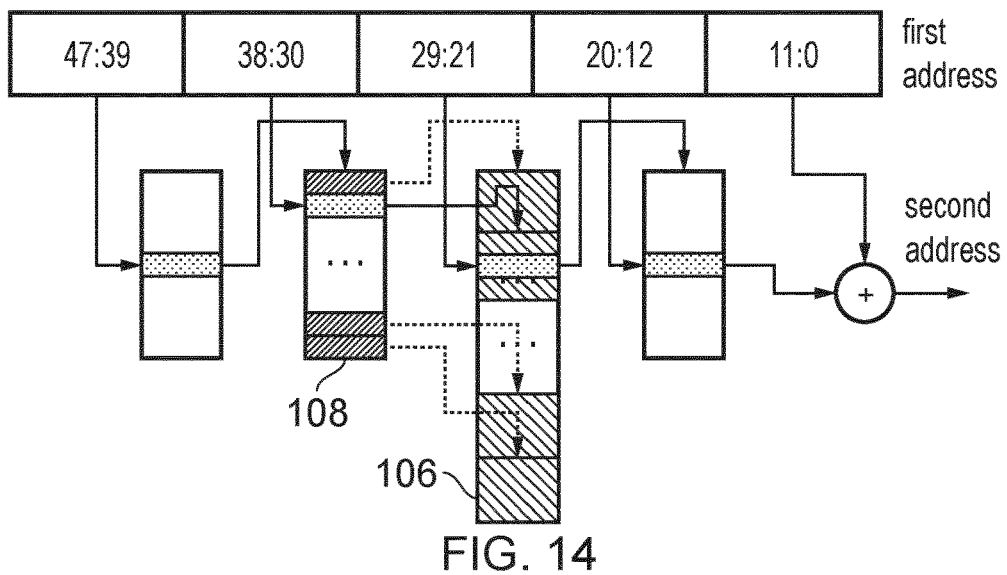
Figure 15A:
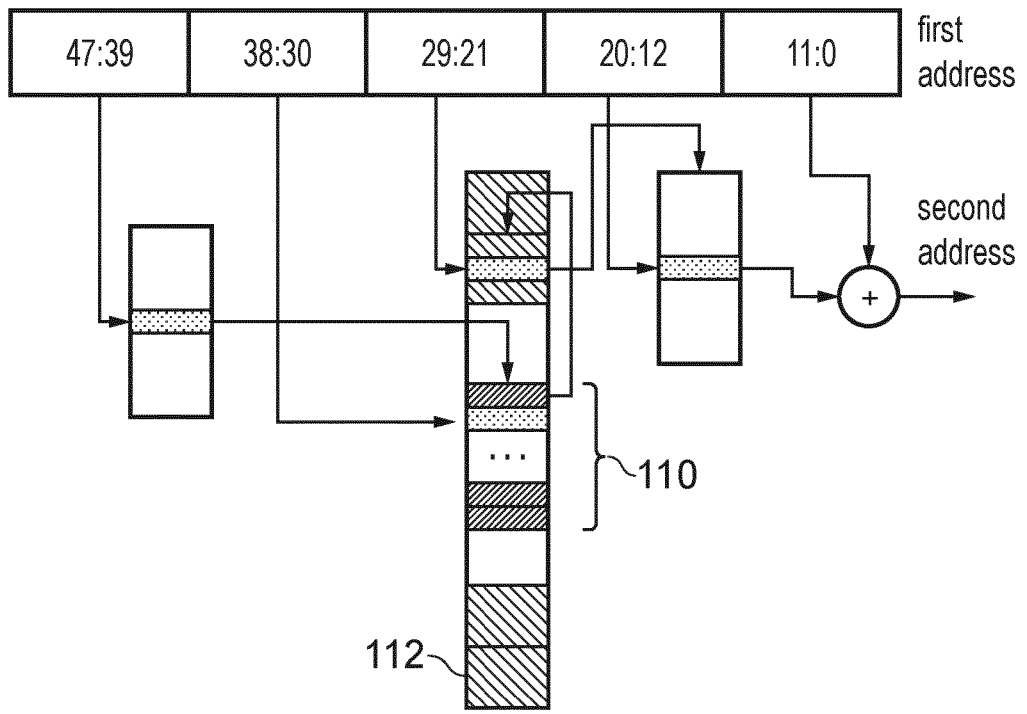
Figure 15B:
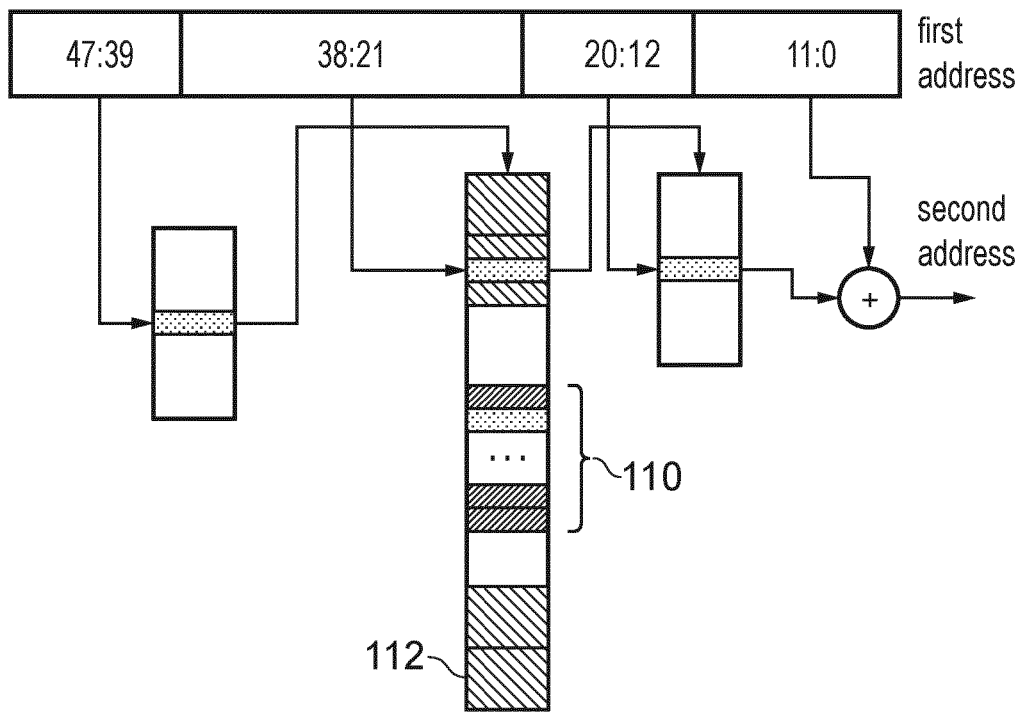
Figure 16:
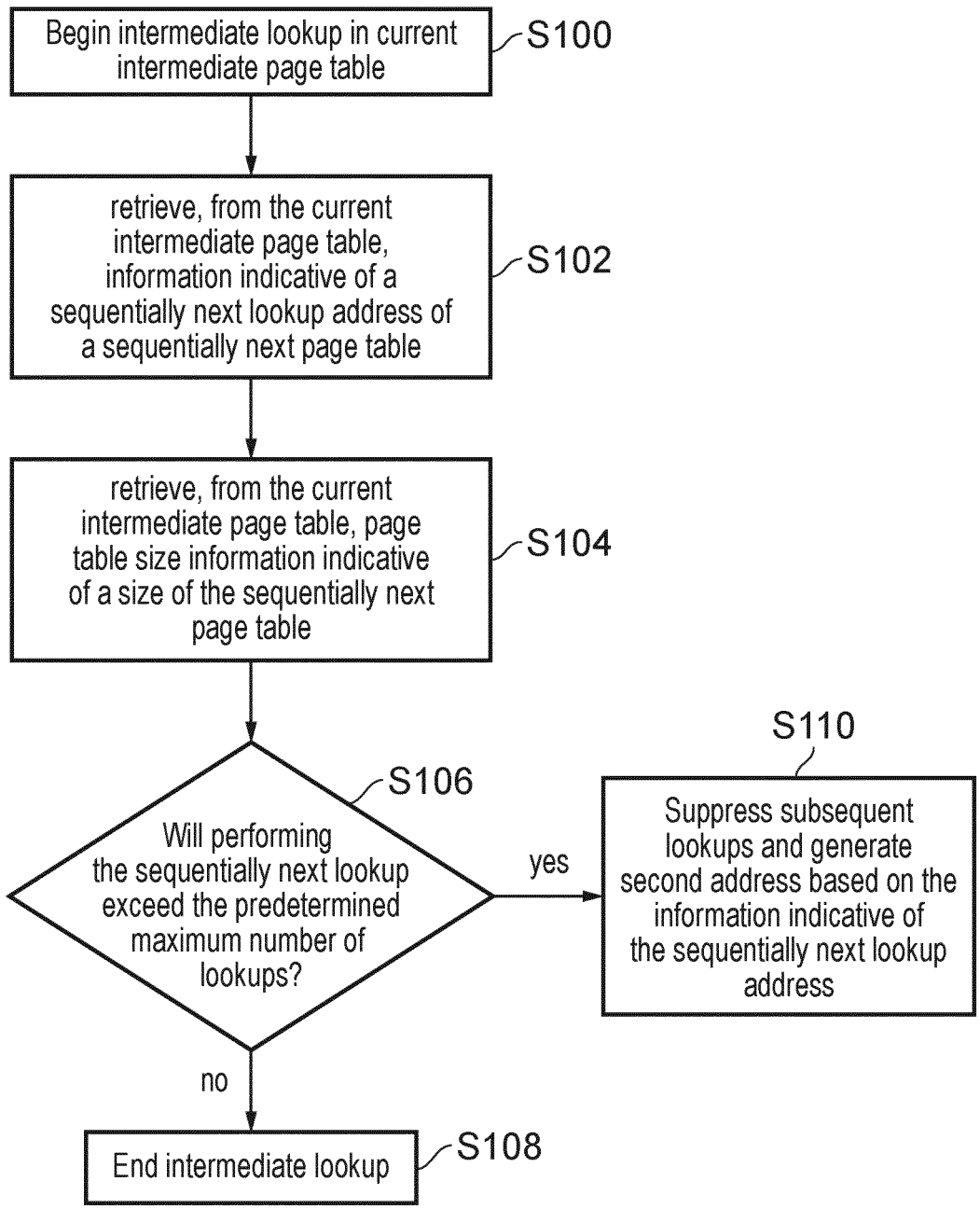
Figure 17:
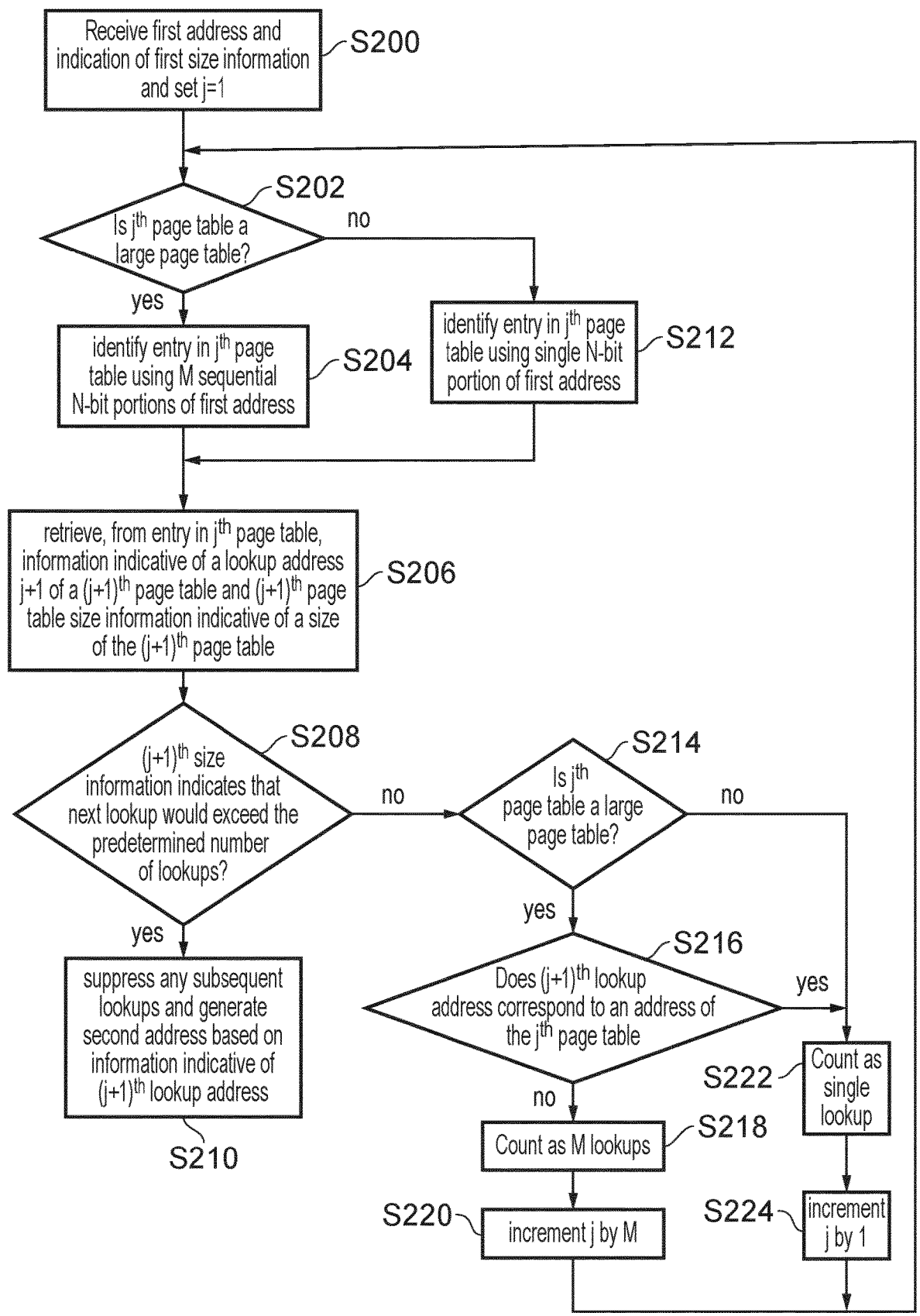

The present techniques will be described further, by way of example only, with reference to embodiments thereof as illustrated in the accompanying drawings, in which:

FIG. 1 schematically illustrates a data processing apparatus according to various configurations of the present techniques;

FIG. 2 schematically illustrates address translation circuitry according to various configurations of the present techniques;

FIG. 3 schematically illustrates further details of address translation circuitry according to various configurations of the present techniques;

FIG. 4 schematically illustrates an address translation according to various configurations of the present techniques;

FIG. 5 schematically illustrates an address translation using a large page table according to various configurations of the present techniques;

FIG. 6 schematically illustrates an address translation according to various configurations of the present techniques;

FIG. 7 schematically illustrates an address translation using recursion according to various configurations of the present techniques;

FIG. 8a schematically illustrates an address translation using recursion according to various configurations of the present techniques;

FIG. 8b schematically illustrates an address translation using recursion according to various configurations of the present techniques;

FIG. 9a schematically illustrates details of an address translation using recursion according to various configurations of the present techniques;

FIG. 9b schematically illustrates details of an address translation using recursion according to various configurations of the present techniques;

FIG. 9c schematically illustrates details of an address translation using recursion according to various configurations of the present techniques;

FIG. 10a schematically illustrates an address translation according to various configurations of the present techniques;

FIG. 10b schematically illustrates an address translation according to various configurations of the present techniques;

FIG. 10c schematically illustrates an address translation according to various configurations of the present techniques;

FIG. 10d schematically illustrates an address translation according to various configurations of the present techniques;

FIG. 11 schematically illustrates an address translation using recursion according to various configurations of the present techniques;

FIG. 12 schematically illustrates use of a page walker cache in an address translation according to various configurations of the present techniques;

FIG. 13 schematically illustrates an address translation according to various configurations of the present techniques;

FIG. 14 schematically illustrates an address translation according to various configurations of the present techniques;

FIG. 15a schematically illustrates an address translation according to various configurations of the present techniques;

FIG. 15b schematically illustrates an address translation according to various configurations of the present techniques;

FIG. 16 schematically illustrates a sequence of steps carried out to perform an intermediate lookup according to various configurations of the present techniques; and FIG. 17 schematically illustrates a sequence of steps carried out to perform an intermediate lookup according to various configurations of the present techniques.

According to some configurations there is provided address translation circuitry responsive to receipt of a first address to perform an address translation between the first address and a second address by performing a predetermined maximum number of sequential lookups in a plurality of page table levels. The address translation circuitry is configured to support regular page table levels comprising $2^N$ entries and large page table levels comprising $2^{N*M}$ entries. Each sequential lookup in a regular page table level is deemed to be a single level lookup of the predetermined maximum number of sequential lookups and each sequential lookup in a large page table level is deemed to be M level lookups of the predetermined maximum number of sequential lookups. The address translation circuitry is further configured to perform an intermediate lookup to retrieve, from a current intermediate page table level of the plurality of page table levels, information indicative of a sequentially next lookup address of a sequentially next page table level and page table level size information indicative of a size of the sequentially next page table level. The address translation circuitry is further configured to, when performing the intermediate lookup, when the page table level size information indicates that the sequentially next lookup corresponds to one of the large page table levels and that performing the sequentially next lookup would exceed the predetermined maximum number of sequential lookups, suppress subsequent lookups of the predetermined maximum number of sequential lookups and generate the second address based on the information indicative of the sequentially next lookup address.

Address translation circuitry performs address translation between a first address and a second address using a predetermined maximum number of sequential lookups. The predetermined number can be set in any way and, in some configurations, can be flexibly defined. However, in some configurations the predetermined number is set in hardware and correlates with a number of bits, or subsections of bits, in the first address. Each lookup of the predetermined number of lookups is performed using a number of indexing bits of the first address and information that is obtained from the sequentially preceding lookup. The predetermined number of lookups is divided into intermediate lookups, which produce an intermediate address to be used in a sequentially next lookup, and a final lookup, which is used to produce the second address. Each of the plurality of page tables contains a set number of entries that is indexed by one of the indexing portions of the first address. The sequential lookups form a page table walk. The predetermined number of lookups results in a particular latency in the page table walk which is dependent on the number of lookups that need to be performed. The inventors of the present techniques have realised that the number of lookups performed can be reduced through the definition of regular page tables and large page tables. Each regular page table comprises $2^N$ (2 to the power of N) entries where N is a positive (non-zero) integer, and each large page table comprises $2^{N*M}$ entries (2 to the power of N times M) entries where M is a positive integer that is greater than 1. The address translation circuitry is arranged to deem each lookup in a regular page table to be a single lookup (i.e., to count each lookup, or otherwise treat each lookup, in a regular page table to be a single lookup) of the predetermined number of lookups and to deem each lookup in a large page table to be M lookups. Hence, it is possible to perform a single lookup in a large page table that is equivalent to M lookups in regular page tables resulting in a reduction in the number of lookups being performed.

The address translation circuitry is configured to, when performing an intermediate lookup, determine whether a sequentially next lookup corresponds to a large page table or not based on size information in the current intermediate page table. In cases where the size information indicates that the sequentially next lookup is a lookup in a large page table, the address translation circuitry can determine that the next entry will be equivalent to M lookups and is therefore able to perform the next lookup using an appropriate number of bits (corresponding to an appropriate number of indexing portions) of the first address. The address translation circuitry is further configured to, when the size information indicates that the sequentially next lookup corresponds to one of the large tables, and when performing the next lookup would exceed the predetermined number of sequential lookups, suppress the subsequent lookups of the predetermined maximum number of sequential lookups. In particular, if the predetermined number of lookups is equal to an integer K and the current number of lookups is J then, when the size information indicates that the next lookup is in a large page table, and J+M>K then the remaining K−J lookups of the predetermined number of lookups are suppressed. In this situation the address translation circuitry does not perform a final lookup, but instead uses the information indicative of the sequentially next lookup address, that has been obtained from the current intermediate page table level, to generate the second address and information from the first address. In such configurations, the second address is generated directly from the next lookup address. In some such configurations a more significant portion of the next lookup address forms a more significant portion of the second address and the remaining less significant portion of the second address is generated by offsetting the less significant portion of the next lookup address by an amount indicated in the least significant portion of the first address.

The number of bits used to index into the page tables can be variously defined and, in some configurations, is different for each lookup in the predetermined number of lookups. However, in some configurations the first address comprises a sequence of N-bit indexing portions, and the address translation circuitry is configured to: index each sequential lookup in one of the regular page table levels using a single N-bit indexing portion of the sequence of N-bit indexing portions; and index each sequential lookup in one of the large page table levels using M sequential N-bit indexing portions of the sequence of N-bit indexing portions. The sequence of N-bit indexing portions is a subsection of the first address which, in some configurations, also includes information for specifying a final portion of the second address or specifying a particular starting address of a first intermediate lookup. Each of the regular page tables comprises a contiguous region of memory comprising $2^N$ entries and is aligned to a boundary between regions of size $2^N$ entries, such that each regular page table address specifies a region of $2^N$ entries and the specific entry can be indexed using the N-bit indexing portion from the first address. In some configurations the final N+D (where $2^D$ corresponds to the size of a page table entry in bytes) bits of the regular page table base address are zero and the address of a particular entry is generated by replacing the final N+D bits of the regular page table base address with an N+D-bit indexing portion generated using the N-bit indexing portion from the first address with D trailing zeros appended as a least significant portion. Similarly, each of the large page tables comprises a contiguous region of memory comprising $2^{N*M}$ entries (equivalent to M contiguous regions of size $2^N$ entries) and is aligned to a boundary between regions of size $2^{N*M}$ entries such that each large page table address specifies a region of $2^{N*M}$ entries and the specific entry can be indexed using the M sequential N-bit indexing portions from the first address. In some configurations the final M*N+D bits of the regular page table address are zero and the address of a particular entry is generated by replacing the final M*N+D bits of the regular page table address with an (M*N+D)-bit indexing portion generated using the N*M-bit indexing portion from the first address with D trailing zeros appended as a least significant portion.

It is desirable to provide a mechanism for mapping a first address to the lookup address of one of the regular or large page table levels, i.e., such that the memory space in which that one of the regular or large page table levels is stored can be accessed via the first address. This can be achieved by performing, as one or more of the predetermined maximum number of lookups, a recursive lookup in which the sequentially next lookup address corresponds to the address of the current intermediate page table. However, the inventors have realised that, when large page tables are present, this mechanism cannot always be used to map the lookup addresses of all the page table levels to a first address. For example, it may be desirable to map a lookup address of a sequentially first page table level. When there are no large page tables present, the lookup address of the sequentially first page table level can be mapped by repeatedly self-referencing the sequentially first page table level. The sequentially first page table level can then be indexed using a final indexing portion of the first address. However, if the first page table level is a large page table level that is treated as M lookups of the predetermined number of lookups, then each lookup in the large page table requires M sequential N-bit portions of the first address. In such a case there would not always be a sufficient number of bits in the final indexing portion to index into the sequentially first page table level and a fault would occur. Hence, in some configurations, when the page table level size information indicates that performing the sequentially next lookup would be within the predetermined maximum number of lookups and when the sequentially next lookup address corresponds to an address of the current intermediate page table, the intermediate lookup is deemed to be a single level lookup of the predetermined maximum number of sequential lookups independent of a current size of the current intermediate page table level. The address translation circuitry is configured to, when performing the sequentially next lookup is within (i.e., does not exceed) the predetermined maximum number of lookups, perform either a sequentially next intermediate lookup or, when performing the sequentially lookup would result in the number of lookups being equal to the predetermined maximum number of lookups, a final lookup. In such a situation, when the current lookup is a self-referencing (recursive) lookup, i.e., a lookup that results in a sequentially next lookup address that is the address of the current intermediate lookup, the current lookup is treated as a single lookup independent of a size of the current lookup. In other words, if the current lookup is a lookup in a current large page table level and it is determined that the sequentially next lookup address is the address of the current large page table level, then the current lookup is determined to be a single lookup rather than the M lookups that would be associated with a non-self-referencing large page table lookup. On the other hand, if the current lookup is a lookup in a current large page table level and it is determined that the sequentially next lookup address is different to the address of the current large page table level then the current lookup is determined to be M lookups. By treating self-referencing lookups as single lookups it is always possible to index into the page table level that results from the predetermined number of lookups and the lookup addresses of the large page tables can be mapped as first addresses.

In some configurations the address translation circuitry is configured to, in response to a control bit indicating that the intermediate lookup is to be treated as a single level lookup, deem the intermediate lookup to be the single level lookup of the predetermined maximum number of sequential lookups independent of a current size of the current intermediate page table level. In some configurations the control bit is provided as a control bit in the preceding page table level that was read in a previous lookup. Alternatively, in some configurations the control bit is encoded within the first address. In some alternative configurations the address translation circuitry is provided with storage circuitry to store a lookup table indicative of page table levels that are large page table levels, and the address translation circuitry is configured to perform a lookup in the lookup table to determine a value of the control bit based on an address of the current intermediate page. The control bit provides an alternative mechanism that avoids the requirement for the address translation circuitry to determine whether a page table level is self-referencing, which requires the comparison of the address of the current page table level and the address of the sequentially next page table level. Hence, by using a control bit to indicate whether the page table level is self-referencing, this comparison can be avoided and a more compact implementation can be provided.

In some configurations when the sequentially next lookup address corresponds to the address of the current intermediate page table and the current lookup corresponds to one of the large page table levels: the current lookup is indexed using a current M sequential portions of the sequence of N-bit indexing portions; and a least significant M minus 1 sequential N-bit indexing portions of the current M sequential indexing portions are a most significant M minus 1 sequential N-bit indexing portions of a sequentially next M sequential indexing portions to be used to index the sequentially next lookup. As each large lookup requires M sequential portions of the sequence of N-bit indexing portions, when a lookup in large page table is a self-referencing lookup a total of two lots of M sequential portions of the sequence of N-bit indexing portions is required in order to perform these two lookups (the lookup that was self-referencing and the next lookup which, because the current lookup is self-referencing, must also be a large lookup). The inventors have realised that, if the first lookup is treated as a single lookup, then the total number of bits required for indexing into the predetermined number of sequential lookups will exceed the total number of bits available in the first address. Hence, where a lookup is self-referencing, a number of the bits used to index into the self-referencing lookup are reused in the sequentially next lookup. For example, where M=2, a lookup in a large page table level requires two sequential N-bit indexing portions. In this example, the first address comprises three sequential N-bit indexing portions: N-bit indexing portion one, N-bit indexing portion two, and N-bit indexing portion three (where N-bit indexing portion one is the most significant indexing portion, followed by N-bit indexing portion two, and subsequently N-bit indexing portion three). If the lookup is self-referencing then the lookup in the large page table level is treated as a single level lookup. As a result the least significant portion (M−1 portions where M=2) of the M=2 sequential indexing portions are reused in the sequentially next lookup. In this case N-bit indexing portion two would be used a second time, in combination with N-bit indexing portion three, to index into the large lookup level the sequentially next lookup. Using this mechanism, and by selecting the placement of the recursive (self-referencing) entry in the large page table level, an appropriate number of lookups can be performed without the requirement to add additional N-bit portions to the first address.

In some implementations the address translation circuitry is required to access a same set of page table levels as a legacy configuration that does not support large page table levels. In order to support such legacy configurations, in some configurations the address translation circuitry is further configured to: recognise a legacy configuration region within one of the large page table levels, the legacy configuration region comprising $2^N$ entries identifying sequentially next lookup address corresponding to the address of the current intermediate page table level; and when the M sequential N-bit indexing portions point to the legacy configuration region of $2^N$ entries, generate a legacy configuration table fault. In such configurations, the large page, which corresponds to M of the predetermined maximum number of sequential lookups, contains a regular page table as one of the $2^M$ contiguous regions each comprising $2^N$ entries. The regular page table is reserved as a legacy configuration region that contains entries pointing to the different $2^N$ regions within the large page table which can be treated, by the legacy configuration, as regular page tables. In this way the legacy configuration is able to interpret the page table levels as though each of the page table levels is a regular page table level. The address translation circuitry, however, is still able to achieve the advantages of using a large page table level so long as the address translation circuitry does not index into the legacy configuration region. Hence, if the M sequential N-bit indexing portions of the first address cause the address translation circuitry to index into the legacy configuration region, a fault is raised. The address translation circuitry can recognise legacy configurations in a variety of ways. In some configurations an additional bit is provided within the page table levels to indicate a legacy region. In other alternative configurations the location of the legacy configuration region in the large table is fixed such that any attempt to index into the fixed region of a large page table results in the legacy configuration fault.

In some configurations the first address specifies a number of indexing portions equal to the predetermined number of lookups and a final portion that is used, in combination with the address of the sequentially next page table level, to generate the second address. When the intermediate lookup is a lookup in a large page table that comprises M entries and the size information indicates that performing the sequentially next lookup would exceed the predetermined maximum number of lookups by one, there are still M−1 (M minus one) indexing portions that are unused. Hence, the final portion of the first address is used, in combination with the M−1 unused indexing portions and the address of the sequentially next page table level, to form the second address. In some configurations the address translation circuitry is configured to, when the page table level size information indicates that performing the sequentially next lookup would exceed the predetermined maximum number of sequential lookups by an amount greater than one, output an invalid translation fault. This is because, when performing the sequentially next lookup would result in the predetermined number of lookups being exceeded by an amount greater than one, there is insufficient information in the first address to generate the second address. Hence, an invalid translation fault is output.

In some configurations the address translation circuitry further comprises storage circuitry to store information indicative of a sequentially first page table level address corresponding to a first intermediate lookup of the predetermined maximum number of sequential lookups and first size information indicative of a size of the first page table level. In some configurations the storage circuitry is a particular memory location. In other configurations the storage circuitry is one or more registers used to store the sequentially first page table level address. The one or more registers also store size information such that the sequentially first intermediate lookup can be set to correspond to one of the large page tables.

In some configurations the storage circuitry stores information indicative of a plurality page table level addresses; and the address translation circuitry is configured to select the sequentially first page table level address from the plurality of page table level addresses based on one or more selection bits of the first address. In some configurations the one or more selection bits is a single bit that is used to select between two first page table level addresses. In other configurations the selection bits comprise a plural number of bits enabling a plurality of first page table level addresses to be selected from. In some configurations the address translation circuitry is configured to recognise the one or more selection bits as the most significant one or more bits of the first address. In other configurations the address translation circuitry is configured to recognise the one or more selection bits as information that is encoded into a plurality of control bits of the first address. In some configurations each of the first page table level addresses that are stored in the storage circuitry comprises its own size information such that, for each of the first page table level addresses, it is possible to uniquely define whether that first page table level is a large page table level or a regular page table level. In other configurations a single set of size information is provided that is used to determine whether all of the first page table level addresses is an address of a large page table level or a small page table level.

In some configurations the address translation circuitry is configured to select the sequentially first page table level address from the plurality of page table level addresses further based on a current privilege level. The privilege level is a privilege level of processing circuitry that is providing the first address for translation by the address translation circuitry. In this way a different first page table level address can be provided for a higher privilege level and a lower privilege level. Using this approach it is possible to maintain a separation between page table levels that are accessed by a processor operating at a higher privilege level and a processor operating at a lower privilege level.

In some configurations the address translation circuitry comprises partial translation storage circuitry to associate intermediate lookup information retrieved during the intermediate lookup with a corresponding subset of bits of the first address already used in the address translation, the intermediate lookup information comprising information indicative of the sequentially next lookup address and the information indicative of the size of the sequentially next page table level. The partial translation storage circuitry allows a sequentially first subset of the predetermined maximum number of sequential lookups to be skipped where the sequentially first subset of the predetermined maximum number of sequential lookups has been performed sufficiently recently that the translation is already stored in the partial translation cache. Each translation is fully defined based on the bits provided in the first address. In some configurations the first address comprises a sequence of indexing portions that are associated with sequential lookup levels of the predetermined maximum number of sequential lookups. The partial translation storage circuitry is configured to store information indicative of each of these translations such that, if a subsequent first address comprises a number of indexing portions that are the same as corresponding indexing portions of a translation that has been competed the result of these translations can be determined from a lookup in the partial translation storage circuitry rather than repeating these lookups.

In some configurations the address translation circuitry is further configured to: perform a partial translation lookup in the partial translation storage circuitry based on the first address; and when the partial translation lookup hits in the partial translation storage circuitry, retrieve the information indicative of the sequentially next lookup address and the information indicative of the size of the sequentially next page table level from the partial translation storage circuitry, and suppress lookups associated with the corresponding subset of bits of the first address already used in the address translation. As an example, if a first address comprising four indexing portions is translated, information indicative of each of the lookups is stored in the partial translation storage circuitry. If a subsequent lookup shares all four indexing portions, then all four lookups can be skipped and the second address can be determined based on a lookup in the partial translation storage circuitry. If however the subsequent lookup only shares the two most significant indexing portions with the first address then lookups associated with the two most significant indexing portions can be skipped and the required information can be extracted from the partial address translation storage circuitry. In order to support lookups corresponding to large page tables and regular page tables, the partial translation storage circuitry is configured to store size information indicative of the size of the sequentially next page table level. Hence, the partial address translation storage circuitry can provide an additional method by which a total number of required lookups can be reduced. When used in combination with the large page table levels, the total number of lookups can be further reduced.

The first address and the second address can be defined in the same address space. However, in some configurations the first address is defined in a first address space and the second address is defined in a second address space. In such configurations the second address space is a different address space from the first address space. In some configurations each of the first address space and the second address space is one of: a virtual address space; an intermediate physical address space; and a physical address space. In this way the address translation circuitry can be configured to support a virtualised system in which a virtual address is translated to an intermediate physical address and then, subsequently, to a physical address.

In some configurations M is one of: a fixed value and the size information is a single bit; and variable and a value of M is indicated by the size information. For some configurations in which M is fixed, the value of M is defined as a central value stored in a register. In other configurations for which M is fixed, the value of M is set by the hardware and cannot be changed. In some configurations M is equal to two. Such configurations result in a simpler implementation. In alternative configurations in which the value of M is variable the value of M is defined by the size information. For example, the size information may comprise two bits enabling four values. The four values can be used to indicate whether the sequentially next lookup corresponds to a regular lookup, or a large lookup of size M=2, M=3, or M=4. This configuration can provide a particularly flexible arrangement of page table levels.

Particular configurations will now be described with reference to the accompanying figures.

FIG. 1 schematically illustrates an example of a data processing apparatus 2 that makes use of address translation circuitry according to various configurations of the present techniques. The data processing apparatus 2 includes a number of stages including a fetch stage 6, a decode stage 10, a rename stage 12, an issue stage 16, an execute stage 18 and a write back stage 20. Instructions move through the pipeline from stage to stage and some instructions may be at one stage at the pipeline while other instructions are pending at another stage. It will be appreciated that this is just an example of a possible pipeline configuration and other examples may have different stage or combinations of stages as required.

The fetch stage 6 fetches instructions, e.g. from an instruction cache. A branch predictor 4 may be provided for predicting the outcomes of branch instructions. The fetched instructions are passed to a decode stage 10 which decodes the instructions to generate decoded instructions which may provide control signals for triggering the execute stage 18 to perform the corresponding processing operation. For some instructions fetched by the fetch stage 6, the decode stage 10 may map the instruction to more than one decoded instruction so that the "instructions" seen by later stages of the pipeline may be in a different form to the instructions fetched from the cache 8. The decoded instructions are passed to a register rename stage 12 for mapping architectural register specifiers specified by the instructions to physical register specifiers identifying corresponding physical registers 14 to be accessed in response to the instructions. The issue stage 16 queues instructions awaiting issue for execution. The execute stage 18 executes instructions which have been issued by the issue stage 16, to carry out various data processing operations in response to the instructions, such as arithmetic or logical operations, or load/store operations to a data cache 30 or a further level cache 32 or memory 34. The execute unit 18 may have a number of execution units 22, 24, 21, 25, including a load store unit 26 for queuing a number of pending load/store operations. The execute units may be capable of speculative execution of one or more instructions and may be provided with speculation control unit 35 to track execution of the speculatively executed instructions. The write back stage 20 writes the results of instructions executed by the execute stage 18 to the physical register file 14 which includes predicate registers 44 and condition status registers 42.

The pipeline also has address translation circuitry 40 for performing translations between a first address and a second address. The address translation circuitry 40 performs translations of first addresses received from the load/store unit 26 and the fetch stage 6 and returns the second address to the load/store unit 26 or the fetch stage 6 from which the first address was received. The address translation circuitry 40 performs the address translation by performing the predetermined maximum number of sequential lookups in page table levels stored in the L2 cache 32 or memory 34.

FIG. 2 schematically illustrates details of address translation circuitry 40 in some example configurations. The address translation circuitry receives a first address 42 and performs a translation to output a second address 44. The address translation circuitry 40 performs the translation by making a predetermined maximum number of sequential lookups in a number of page tables. The page tables comprise regular page table levels 48 that comprise $2^N$ entries and large page table levels that comprise $2^{N*M}$ entries. Each lookup in one of the regular page table levels 48 is deemed to be (i.e., is counted as) a single lookup of the predetermined maximum number of sequential lookups. Each lookup in one of the large page table levels 46 is deemed to be M lookups of the predetermined maximum number of sequential lookups. Each lookup of the predetermined maximum number of lookups uses information from a preceding lookup and information from the first address. The predetermined maximum number of lookups comprises intermediate lookups that produce an address of sequentially next lookup in a sequentially next page table level and page table level size information indicative of a size of the sequentially net page table level. When it is determined, during an intermediate lookup, that a sequentially next lookup of the predetermined maximum number of lookups corresponds to a large lookup and that performing the sequentially next lookup would exceed the predetermined maximum number of sequential lookups, subsequent lookups are suppressed and the second address 44 is output based on the sequentially next lookup address determined from the current intermediate lookup and information from the first address 42.

The address translation circuitry 40 outputs the second address generated from the sequentially last lookup in the sequence of lookups. As discussed, this may be an output address obtained from an intermediate lookup (where it is determined that performing the sequentially next lookup would exceed the predetermined maximum number of lookups) or, otherwise, an output address obtained from the final lookup. Unlike the addresses from preceding lookups which point to a page table (large or regular) in memory, the output address is directly used to obtain the second address such that a number of bits of the second address are the same as a number of bits of the output address. In particular, the output address contains a number of bits, for example, a 32-bit output address to be used in a 32-bit address space (it would be readily apparent to the skilled person that other address space sizes, for example a 64-bit address space could also be used). At this stage, the output address indicates a region of address space and not a particular second address. The particular second address, that is to be output by the address translation circuitry 40, is generated by offsetting the output address by a number of least significant bits from the first address. This is achieved by taking a more significant portion of the output address and appending the least significant bits of the first address to the more significant portion of the output address. For example, when the second address is a 32-bit address, and where the output address indicates a regular sized region of memory, the second address is generated by taking the most significant 20-bits of the output address and appending 12-bits of the first address to the most significant 20-bits. As an alternative example, when the second address is a 32-bit address, and where the output address indicates a large sized region of memory, the second address is generated by taking the most significant 11-bits of the output address and appending 21-bits of the first address to the most significant 11-bits. Alternatively, the second address can be generated by performing an arithmetic operation to combine the output address and the least significant portion of the first address.

FIG. 3 schematically illustrates further details of the address translation circuitry 40 in some example configurations. The address translation circuitry comprises partial translation storage circuitry 50 to cache information related to previous address translations. The address translation circuitry 40 is also provided with a privileged base register 52 and an unprivileged base register 54. The privileged base register 52 and the unprivileged base register 54 each comprise an address of a sequentially first page table level and size information indicative of a size of the sequentially first page table level. The address translation circuitry 40 selects between the privileged base register 52 and the unprivileged base register 54 based on information stored in selection bits of the first address 42. In this way the address translation circuitry 40 maintains a distinction between translations that are associated with addresses that are provided by processing circuitry that is operating in a privileged mode and processing circuitry that is operating in an unprivileged mode. The address translation circuitry 40 is further provided with a fault output indication 56. The fault output indication 56 provides an indication of faults that occur during operation of the address translation circuitry 40. The fault indication 56 is used to indicate address translation faults and privilege level faults.

FIG. 4 schematically illustrates details of an address translation that is carried out by the address translation circuitry 40 according to various configurations. The address translation circuitry 40 receives a first address. The first address comprises 48 bits which includes a sequence of indexing portions (bits 47 down to 39; bits 38 down to 30; bits 29 down to 21; and bits 20 down to 12). Each indexing portion of the sequence of indexing portions corresponds to (is used for) a lookup level of the predetermined maximum number of sequential lookups. In the illustrated configuration the predetermined maximum number of lookups is four and the first address comprises one indexing portion for each of the predetermined maximum number of lookups.

Bits 47 down to 39 of the first address are the L0 indexing bits that are used to index into the page table level accessed during the L0 lookup (the sequentially first intermediate lookup of the predetermined number of lookups). The L0 lookup is performed in a page table level at a page table address (L0 base address) stored in storage circuitry of the address translation circuitry. The storage circuitry further comprises size information indicating that the L0 lookup is a lookup in a regular page table level (Next Large: 0). The lookup performed based on the L0 base address and the L0 indexing bits returns a base address to be used for the sequentially next look, the L1 lookup, and size information indicating that the L1 lookup is a lookup in a regular page table level.

Bits 38 down to 30 of the first address are the L1 indexing bits that are used to index into the page table level accessed during the L1 lookup (the sequentially second intermediate lookup of the predetermined number of lookups). The L1 lookup is performed in a page table level at the base address obtained during the L0 lookup (L1 base address). The lookup performed based on the L1 base address and the L1 indexing bits returns a base address to be used for the sequentially next lookup, the L2 lookup, and size information indicating that the L2 lookup is a lookup in a regular page table level.

Bits 29 down to 21 of the first address are the L2 indexing bits that are used to index into the page table level accessed during the L2 lookup (the sequentially third intermediate lookup of the predetermined number of lookups). The L2 lookup is performed in a page table level at the base address obtained during the L1 lookup (L2 base address). The lookup performed based on the L2 base address and the L2 indexing bits returns a base address to be used for the sequentially next lookup, the L3 lookup, and size information indicating that the L3 lookup is a lookup in a regular page table level.

Bits 20 down to 12 of the first address are the L3 indexing bits that are used to index into the page table level accessed during the L3 lookup (the final lookup of the predetermined number of lookups). The L3 lookup is performed in a page table level at the base address obtained during the L2 lookup (L3 base address). The lookup performed based on the L3 base address and the L3 indexing bits returns an address that is combined with the addressing portion (bits 11 down to 0) of the first address to obtain the second address.

FIG. 5 schematically illustrates details of an address translation that is carried out by the address translation circuitry 40 according to various configurations. As in FIG. 4, the address translation circuitry 40 receives a first address. The first address is a 48-bit first address which comprises a sequence of indexing portions (bits 47 down to 39; bits 38 down to 21; and bits 20 down to 12). Each indexing portion of the sequence of indexing portions corresponds to (is used for) a lookup level of the predetermined maximum number of sequential lookups. In the illustrated configuration the predetermined maximum number of lookups is four. However, the first address comprises only three indexing portions. The second indexing portion (bits 38 down to 21) corresponds to a large lookup that is indexed using M−2 sequential indexing portions (i.e., the combination of bits 38 down to 30 and bits 29 down to 21). In order that the indexing portions of the first address are correctly interpreted by the address translation circuitry, the corresponding page table levels store size information indicating when a next page table level is a large page table level. The size information is indicated in the figures by the "Next Large" indicator or the "NL" indicator being set to 1, it is noted that where no "Next Large" or "NL" indicator is present in the figures, it implicit that the "Next Large" or "NL" indicator is set to 0 indicating that the next page table level is a regular page table level. It can be seen, through comparison to FIG. 4, that the indexing portions associated with the L1 and L2 lookups have been merged.

Bits 47 down to 39 of the first address are the L0 indexing bits that are used to index into the page table level accessed during the L0 lookup (the sequentially first intermediate lookup of the predetermined number of lookups). The L0 lookup is performed in a page table level at a page table address (L0 base address) stored in storage circuitry of the address translation circuitry. The storage circuitry further comprises size information indicating that the L0 lookup is a lookup in a regular page table level. The lookup performed based on the L0 base address and the L0 indexing bits returns a base address to be used for the sequentially next lookup, a merged L1/L2 lookup, and size information (Next Large: 1) indicating that the L1/L2 lookup is a lookup in a large page table level.

Bits 38 down to 21 of the first address are the L1/L2 indexing bits that are used to index into the large page table level accessed during the L1/L2 lookup (the sequentially second lookup that is a single lookup in a large page table and that is equivalent to the L1 lookup and the L2 lookup of FIG. 4). The L1/L2 lookup is performed in a large page table level at the base address obtained during the L0 lookup (L1/L2 base address). The lookup performed based on the L1/L2 base address and the L1/L2 indexing bits returns a base address to be used for the sequentially next lookup, the L3 lookup, and size information indicating that the L3 lookup is a lookup in a regular page table level.

Bits 20 down to 12 of the first address are the L3 indexing bits that are used to index into the page table level accessed during the L3 lookup (the final lookup of the predetermined number of lookups). The L3 lookup is performed in a page table level at the base address obtained during the L1/L2 lookup (the L3 base address). The lookup performed based on the L3 base address and the L3 indexing bits returns an address that is combined with the addressing portion (bits 11 down to 0) of the first address to obtain the second address.

In the illustrated configuration the L1 and L2 lookups were combined to form a single lookup in a large page table. It would be readily apparent to the skilled person that any sequential page table level lookups could be combined based on the techniques disclosed herein. Furthermore, the illustrated configurations show that 9 bits are used for each of N-bit portion. However, in alternative configurations a different number of bits can be provided and different lookup levels can be provided that each use a different number of bits.

FIG. 6 schematically illustrates the definition of the first page table level address based on information that is stored in storage circuitry 60 of the address translation circuitry 40. The sequentially first page table level address (L0 base address) is determined using one or more selection bits from the first address. The address translation circuitry 40 performs a lookup in the storage circuitry 60 based on the one or more selection bits. The one or more selection bits define a sequentially first page table level address from a plurality of sequentially first page table level addresses that are stored in the storage circuitry. In the illustrated configuration the address translation from the first address to the second address continues as described in relation to FIG. 4.

FIG. 7 schematically illustrates the concept of recursive (self-referencing) lookups. Recursive lookups are used to map a first address to an address of the page table levels. In the illustrated embodiment the address translation circuitry is configured to perform four sequential lookups (the predetermined maximum number of sequential lookups is four). In the absence of large page tables the predetermined number of lookups are performed in sequential page table levels L0, L1, L2 and L3 (as described in reference to FIG. 4). When a recursive lookup occurs a same page table level is referred to twice. As a result one or more of the page table lookups could be looked up more than once.

In the top lookup sequence of FIG. 7, a sequentially first page table level defines an address of a sequentially first intermediate lookup 70. This is an L0 lookup 70 in an (L0) page table. The notation "L0" is used to indicate that the lookup is the L0 level, the notation "(L0)", i.e., the lookup level within parentheses, is used to indicate that the page table that is being looked up is the page table from the L0 lookup 70. In the L0 lookup 70, the (L0) page table is indexed using the L0 indexing portion of the first address. In this case the L0 lookup returns an entry in the (L0) page table level that points to the (L0) page table. The L1 lookup 72 is then performed using the L1 indexing portion in the (L0) page table, i.e., the same page table that was used in the L0 lookup 70. In the L1 lookup 72 the (L0) page table, indexed using the L1 indexing portion, returns an address of the (L1) page table level, i.e., the page table level that, without the self-referencing lookup, would have been referenced in the L1 lookup 72. Hence, the L2 lookup 74 is performed in the (L1) page table, using the L2 indexing portion of the first address, which returns an address of the (L2) page table level, i.e., the page table level that, without the self-referencing lookup, would have been referenced in the L2 lookup 74. Hence, the L3 lookup 76 is performed in the (L2) page table, using the L3 indexing portion of the first address, and returns an address of the (L3) page table. As four lookups have now been performed, the address of the (L3) page table is output and used to generate the second address.

In the bottom lookup sequence of FIG. 7, a sequentially first page table level defines an address of a sequentially first intermediate lookup 78. This is an L0 lookup 78 in an (L0) page table. In the L0 lookup 78, the (L0) page table is indexed using the L0 indexing portion of the first address. In this case the L0 lookup returns an entry in the (L0) page table level that points to the (L0) page table. The L1 lookup 80 is then performed using the L1 indexing portion in the (L0) page table, i.e., the same page table that was used in the L0 lookup 78. In the L1 lookup 80 the (L0) page table, indexed using the L1 indexing portion, again returns an address of the (L0) page table level, i.e., the page table level that, without the self-referencing lookups, would have been referenced in the L0 lookup 78. Hence, the L2 lookup 82 is performed in the (L0) page table, using the L2 indexing portion of the first address, which returns an address of the (L1) page table level, i.e., the page table level that, without the self-referencing lookup, would have been referenced in the L1 lookup 80. Hence, the L3 lookup 84 is performed in the (L1) page table, using the L3 indexing portion of the first address, and returns an address of the (L2) page table. As four lookups have now been performed, the address of the (L2) page table is output and used to generate the second address.

The same approach can be used to generate the second address based from the (L1) page table address using a further self-referencing lookup as the L2 lookup 82. Furthermore, the same approach can be used to generate the second address based on the (L0) page table address using two further self-referencing lookups as the L2 lookup 82 and the L3 lookup 84. In this way the address of each page table level can be mapped using self-referencing lookups.

FIGS. 8a to 8b schematically illustrate the use of recursion for address translation by address translation circuitry 40 when large page tables are used. FIG. 8a schematically illustrates the use of recursion to map an address of a large page table. As in FIGS. 4 to 7 the address translation circuitry 40 is configured to perform, as the predetermined maximum number of sequential lookups, four level lookups in the page tables. The first address comprises 48 address bits that comprises three 9-bit portions. Bits 47 down to 39 define the index to be used during the L0 level lookup. Bits 38 down to 30 define the index to be used during the L1 level lookup. Bits 29 down to 21 define the index to be used during the L2 level lookup. The least significant 21 bits, bits 20 down to 0, are used in combination with the output from the L2 level lookup to form the second address.

In response to receipt of the first address, the address translation circuitry determines the sequentially first page table level address. This is determined either from additional bits of the first address (not shown) or from a register storing a sequentially first page table level address. The L0 level lookup is then performed using the sequentially first page table level address to determine the (L0) page table which is indexed using bits 47 down to 39 from the first address. The L0 lookup is a lookup in a regular page table, which is therefore counted as a single lookup of the predetermined number of lookups. In this case the entry in the (L0) page table is a self-referencing entry which points back to the (L0) page table. Hence, the L1 lookup is performed in the (L0) page table using the L1 indexing bits (bits 38 down to 30 from the first address). The L1 lookup is a lookup in a regular page table, which is therefore counted as a single lookup of the predetermined number of lookups. The L1 lookup is also a self-referencing entry which points back to the (L0) page table. Hence, the L2 lookup is performed in the (L0) page table using the L2 indexing bits (bits 29 down to 21 of the first address). The L2 lookup is a lookup in a regular page table, which is therefore counted as a single lookup of the predetermined number of lookups. Unlike the L0 level lookup and the L1 level lookup, the L2 level lookup is not a self-referencing entry. Instead, the L2 level lookup results in an entry that points to the L1/L2 large page table. The size information that is determined from the L2 level lookup indicates to the address translation circuitry that the next lookup is a large lookup (NL: 1–Next Large set to 1) that will count as M=2 lookups of the predetermined number of lookups. At this point the address translation circuitry 40 has performed three lookups (the L0 level lookup, the L1 level lookup, and the L2 level lookup), each of which is deemed to be a single level lookup. The address translation circuitry has therefore performed three of the four maximum sequential lookups. As the L2 level lookup indicates that the next level lookup is a large lookup, if the sequentially next lookup were to be performed then the number of lookups performed would be greater than the four maximum sequential lookups. Hence, the address translation circuitry 40 suppresses the remaining lookups of the four maximum sequential lookups and generates the second address using the base address of the (L1/L2) large page table (that was determined during the L2 level lookup) and the least significant 21 bits of the first address to generate the second address, hence, providing an address of an entry of the (L1/L2) large page table.

FIG. 8b schematically illustrates an alternative address translation performed by the address translation circuitry 40 in response to receipt of a first address. As in FIGS. 4 to 7 and 8a the address translation circuitry 40 is configured to perform, as the predetermined maximum number of sequential lookups, four level lookups in the page tables. The first address comprises 48 address bits that comprises two 9-bit portions. Bits 47 down to 39 define the index to be used during the L0 level lookup. Bits 38 down to 30 define the index to be used during the L1 level lookup. The first address further comprises a single 18-bit portion. Bits 29 down to 12 define the index to be used during the L2/L3 level lookup. The least significant 12 bits of the first address, bits 11 down to 0, are used in combination with the output from the L2/L3 level lookup to form the second address.

In response to receipt of the first address, the address translation circuitry determines the sequentially first page table level address. This is determined either from additional bits of the first address (not shown) or from a register storing a sequentially first page table level address. The L0 level lookup is then performed using the sequentially first page table level address to determine the (L0) page table which is indexed using bits 47 down to 39 from the first address. The L0 lookup is a lookup in a regular page table, which is therefore counted as a single lookup of the predetermined number of lookups. In this case the entry in the (L0) page table is a self-referencing entry which points back to the (L0) page table. Hence, the L1 lookup is performed in the (L0) page table using the L1 indexing bits (bits 38 down to 30 from the first address). The L1 lookup is a lookup in a regular page table, which is therefore counted as a single lookup of the predetermined number of lookups. Unlike the L0 level lookup, the L1 level lookup is not a self-referencing entry. Instead, the L1 level lookup results in an entry that points to the (L1/L2) large page table. The size information that is determined from the L1 level lookup indicates to the address translation circuitry that the next lookup is a large lookup (NL: 1-Next Large set to 1) that will count as M=2 lookups of the predetermined number of lookups. At this point the address translation circuitry 40 has performed two lookups (the L0 level lookup, and the L1 level lookup), each of which is deemed to be a single level lookup. The address translation circuitry has therefore performed two of the four maximum sequential lookups. As the L1 level lookup indicates that the next level lookup is a large lookup, if the sequentially next lookup were to be performed then the number of lookups performed would be equal to the four maximum sequential lookups. Hence, the address translation circuitry 40 performs the L2 level lookup and the L3 level lookup as a single L2/L3 level lookup in the (L1/L2) large page table indexed by the L2/L3 indexing bits (bits 29 down to 12 of the first address). This is the final lookup of the four maximum lookups. Hence the output from the L2/L3 lookup in the (L1/L2) page table is used in combination with the least significant 12 bits of the first address to generate the second address which is used to access an entry of the (L3) page table.

FIGS. 9a to 9c schematically illustrate the use of different N-bit portions of first addresses to index different level lookups of the address translation when a current level lookup is a lookup in a large page table. In FIG. 9a a first address 90 is provided that comprises four N-bit portions 90(A), 90(B), 90(C), and 90(D). The first address 90 also has a least significant H-bit portion 90(E) that is used to generate the second address based on the output from the sequence of level lookups. As in FIGS. 4 to 8 the predetermined maximum number of sequential lookups if four. The sequentially first lookup is an L0/L1 lookup in a large page table (M=2). The L0/L1 lookup in the large page table is indexed using M=2 of the N-bit portions of the first address 90. In this case, the L0/L1 lookup is indexed using N-bit portion 90(A) and N-bit portion 90(B). In FIG. 9a it is determined, based on the L0/L1 lookup that the next level lookup is a lookup in a regular page table. Hence, the next level lookup is the L2 level lookup which is indexed using a single N-bit portion 90(C) of the first address 90. It is determined from the L2 lookup that the sequentially next lookup is also a lookup in a regular page table. Hence, the next level lookup is the L3 level lookup which is indexed using a single N-bit portion 90(D) of the first address 90. The output from the L3 level lookup is combined with the H-bit portion 90(E) of the first address 90 to generate the second address.

In FIG. 9b a first address 92 is provided that comprises four N-bit portions 92(A), 92(B), 92(C), and 92(D). The first address 92 also has a least significant H-bit portion 92(E) that is used to generate the second address based on the output from the sequence of level lookups. As in FIGS. 4 to 8 the predetermined maximum number of sequential lookups if four. The sequentially first lookup is an L0/L1 lookup in a large page table (M=2). The L0/L1 lookup in the large page table is indexed using M=2 of the N-bit portions of the first address 92. In this case, the L0/L1 lookup is indexed using N-bit portion 92(A) and N-bit portion 92(B). In FIG. 9b it is determined, based on the L0/L1 lookup that the next level lookup is a lookup in a large page table that is different to the large page table referenced in the L0/L1 lookup. Hence, the next level lookup is the L2/L3 level lookup in a large page table (M=2) which is indexed using M=2 sequential N-bit portions 92(C) and 92(D) of the first address 92. The output from the L2/L3 level lookup is combined with the H-bit portion 92(E) of the first address 92 to generate the second address.

In FIG. 9c a first address 94 is provided that comprises four N-bit portions 94(A), 94(B), 94(C), and 94(D). The first address 94 also has a least significant H-bit portion 94(E) that is used to generate the second address based on the output from the sequence of level lookups. As in FIGS. 4 to 8 the predetermined maximum number of sequential lookups if four. The sequentially first lookup is an L0/L1 lookup in a large page table (M=2). The L0/L1 lookup in the large page table is indexed using M=2 of the N-bit portions of the first address 94. In this case, the L0/L1 lookup is indexed using N-bit portion 94(A) and N-bit portion 94(B). In FIG. 9c it is determined, based on the L0/L1 lookup that the next level lookup is a lookup in a large page table and that the L0/L1 lookup is a self-referencing lookup that references the (L0/L1) page table. Because the L0/L1 lookup is a self-referencing lookup, the L0/L1 lookup is deemed to be a single level lookup. Hence, the next level lookup is the L1/L2 level lookup in the (L0/L1) large page table. The L1/L2 level lookup is indexed using M=2 of the N-bit portions of the first address 94. The address translation circuitry 40 reuses the least significant M−1=1 of the N-bit portions 94(A), 94(B) that were used to index the L0/L1 level lookup as the most significant M−1=1 of the N-bit portions to index into the L1/L2 level lookup in the (L0/L1). The L1/L2 lookup is therefore performed using the N-bit portion 94(B) and the N-bit portion 94(C). Based on the L1/L2 lookup it is determined that the next lookup is a lookup in a regular page table. Hence, the next level lookup is the L3 level lookup in the (L2) page table which is indexed using a single N-bit portion 94(D) of the first address 90. The output from the L3 level lookup in the (L2) level page table is combined with the H-bit portion 90(E) of the first address 90 to generate the second address within the (L3) level page table.

FIGS. 10a to 10d schematically illustrate address translation based on the principles illustrated in FIGS. 9a to 9c. In FIG. 10a a first address is translated to a second address by the address translation circuitry 40. The predetermined maximum number of sequential lookups is four. The address translation circuitry determines the sequentially first page table level address based on a most significant bit of the first address (not shown). The sequentially first address points to a large page table (M=2) which is indexed using M=2 of the N-bit portions of the first address. Hence, the first lookup is the L0/L1 level lookup in the (L0/L1) page table indexed by bits 47 down to 30 of the first address. The sequentially next page table address that is output by L0/L1 lookup is the address of the (L0/L1) page table. The size information output from the L0/L1 level lookup indicates that the next-level page table is a large page table (NL set to 1). Hence, the next lookup is determined to be the L1/L2 level lookup in the (L0/L1) page table which is indexed by using the M−1=1 of the N-bit portions that were used to index the L0/L1 lookup as the most significant M−1=1 N-bit portions used to index the L1/L2 level lookup in the (L0/L1) page table. In this case, bits 38 down to 21 of the first address are used to index the L1/L2 lookup. The L1/L2 lookup returns an address of the sequentially next page table that is different to the (L0/L1) page table level. The size information returned by the L1/L2 lookup indicates that the next page table is a regular page table (NL set to 0). Hence, the next lookup is the L3 lookup in the (L2) page table which is indexed by the sequentially next N-bit portion of the first address. In this case, the L3 lookup in the (L2) page table is indexed using bits 20 down to 12 of the first address. The L3 lookup returns an address of the sequentially next page table, i.e., the (L3) page table. As the predetermined maximum number of lookups has been performed (one lookup for the L0/L1 self-referencing level lookup, M=2 lookups for the L1/L2 level lookup, and one lookup for the L3 level lookup) the L3 page table is combined with the least significant 12 bits of the first address (bits 11 down to 0) to generate the second address.

In FIG. 10b a first address is translated to a second address by the address translation circuitry 40. The predetermined maximum number of sequential lookups is four. The address translation circuitry determines the sequentially first page table level address based on a most significant bit of the first address (not shown). The sequentially first address points to a large page table (M=2) which is indexed using M=2 of the N-bit portions of the first address. Hence, the first lookup is the L0/L1 level lookup in the (L0/L1) page table indexed by bits 47 down to 30 of the first address. The sequentially next page table address that is output by L0/L1 lookup is the address of the (L0/L1) page table. The size information output from the L0/L1 level lookup indicates that the next-level page table is a large page table (NL set to 1). Hence, the next lookup is determined to be the L1/L2 level lookup in the (L0/L1) page table which is indexed by using the M−1=1 of the N-bit portions that were used to index the L0/L1 lookup as the most significant M−1=1 N-bit portions used to index the L1/L2 level lookup in the (L0/L1) page table. In this case, bits 38 down to 21 of the first address are used to index the L1/L2 lookup. The L1/L2 lookup returns an address of the sequentially next page table that is different to the (L0/L1) page table level. The size information returned by the L1/L2 lookup indicates that the next page table is a large page table (NL set to 1). So far the address translation circuitry has performed three level lookups (one lookup for the L0/L1 self-referencing level lookup, and M=2 for the L1/L2 level lookup). As the next level lookup is in a large page table, performing this lookup would result in the number of lookups exceeding the predetermined maximum number of lookups. Hence, further lookups are suppressed and the (L2/L3) level page table address that is output from the (L0/L1) page table during the L1/L2 lookup is used to generate the second address. As the output page table level is a large page table, the remaining 21 bits of the first address are required to generate the second address.

In FIG. 10c a first address is translated to a second address by the address translation circuitry 40. For the address translation in FIG. 10c, the predetermined maximum number of sequential lookups is five. The address translation circuitry determines the sequentially first page table level address based on a most significant bit of the first address (not shown). The sequentially first address points to a large page table (M=2) which is indexed using M=2 of the N-bit portions of the first address. Hence, the first lookup is the L0/L1 level lookup in the (L0/L1) page table indexed by bits 56 down to 39 of the first address. The sequentially next page table address that is output by L0/L1 lookup is the address of the (L0/L1) page table. The size information output from the L0/L1 level lookup indicates that the next-level page table is a large page table (NL set to 1). Hence, the next lookup is determined to be the L1/L2 level lookup in the (L0/L1) page table which is indexed by using the M−1=1 of the N-bit portions that were used to index the L0/L1 lookup as the most significant M−1=1 N-bit portions used to index the L1/L2 level lookup in the (L0/L1) page table. In this case, bits 47 down to 30 of the first address are used to index the L1/L2 lookup. The L1/L2 lookup returns an address of the sequentially next page table that is different to the (L0/L1) page table level. The size information returned by the L1/L2 lookup indicates that the next page table is a large page table (NL set to 1). So far the address translation circuitry has performed three level lookups (one lookup for the L0/L1 self-referencing level lookup, and M=2 for the L1/L2 level lookup). As the next level lookup is in a large page table, performing this lookup would result in the number of lookups being equal to the predetermined maximum number of lookups (five in this address translation). Hence, the next lookup is determined to be the L3/L4 level lookup in the (L2/L3) page table indexed by bits 29 down to 12 of the first address. The L3/L4 level lookup in the (L2/L3) page table returns an address of an (L4) page table. This address is combined with the least significant 12 bits of the first address to generate a second address that is within the (L4) level page table.

FIG. 10d illustrates an alternative configuration in which a control bit, stored in the current page table level, is used to indicate whether a lookup is a self-referencing lookup. In FIG. 10d a first address is translated to a second address by the address translation circuitry 40. For the address translation in FIG. 10d, the predetermined maximum number of sequential lookups is five. Furthermore, the address translation circuitry 40 is configured to determine whether to count the page table levels as a single lookup level based on a control bit rather than by directly determining whether the page table level is a self-referencing page table level. The address translation circuitry determines the sequentially first page table level address based on a most significant bit of the first address (not shown). The sequentially first address points to a large page table (M=2) which is indexed using M−2 of the N-bit portions of the first address. Hence, the first lookup is the L0/L1 level lookup in the (L0/L1) page table indexed by bits 56 down to 39 of the first address. The sequentially next page table address that is output by L0/L1 lookup is the address of the (L0/L1) page table. However, rather than determining whether the L0/L1 lookup is a self-referencing lookup through the comparison of the address used for the L0/L1 lookup and the address output from the L0/L1 lookup, the address translation circuitry 40 determines that the L0/L1 lookup is a self-referencing lookup because the control bit is set. The size information output from the L0/L1 level lookup indicates that the next-level page table is a large page table (NL set to 1). Hence, the next lookup is determined to be the L1/L2 level lookup in the (L0/L1) page table which is indexed by using the M−1=1 of the N-bit portions that were used to index the L0/L1 lookup as the most significant M−1=1 N-bit portions used to index the L1/L2 level lookup in the (L0/L1) page table. In this case, bits 47 down to 30 of the first address are used to index the L1/L2 lookup. The L1/L2 lookup returns an address of the sequentially next page table that is different to the (L0/L1) page table level. However, rather than determining that the address of the sequentially next lookup does not correspond to the address of the L1/L2 level lookup, the address translation circuitry determines that the L1/L2 level lookup is not a self-referencing lookup based on the control bit, which in this case is set to zero. The size information returned by the L1/L2 lookup indicates that the next page table is a large page table (NL set to 1). So far the address translation circuitry has performed three level lookups (one lookup for the L0/L1 self-referencing level lookup, and M=2 for the L1/L2 level lookup). As the next level lookup is in a large page table, performing this lookup would result in the number of lookups being equal to the predetermined maximum number of lookups (five in this address translation). Hence, the next lookup is determined to be the L3/L4 level lookup in the (L2/L3) page table indexed by bits 29 down to 12 of the first address. The L3/L4 level lookup in the (L2/L3) page table returns an address of an (L4) page table. This address is combined with the least significant 12 bits of the first address to generate a second address that is within the (L4) level page table.

FIG. 11 schematically illustrates the effect of an address translation where a final lookup of the predetermined number of lookups indicates that the next level lookup is a large page table (M>1). The address translation circuitry 40 performs translation of the first address with a predetermined maximum number of sequential lookups equal to four. The sequentially first to sequentially third level lookups (the L0 level lookup, the L1 level lookup, and the L2 level lookup) are not self-referencing lookups and are lookups in regular page tables. Hence, the L3 lookup is the sequentially fourth level lookup. In the L3 lookup it is determined that the size information (NL set to 1) indicates that address output corresponds to an address of a large page table (M=2). As there have already been four level lookups (each of L0 to L3 counts as a single level lookup), the address translation circuitry determines that it is not possible to continue as there are not enough bits left in the first address to generate an address for a large page table which requires two N-bit segments for byte addressing or two N-bit segments+3-bits for bit addressing. As there is an insufficient number of bits remaining in the first address, the address translation circuitry outputs a fault.

FIG. 12 schematically illustrates the use of storage circuitry (page walker cache 100) in the address translation circuitry when translating from a virtual address (VA) as a first address to a physical address (PA) as a second address. The address translation circuitry receives the virtual address and performs an initial lookup in the page walker cache 100. The lookup in the page walker cache 100 determines if the virtual address, or a portion thereof, has already been recently translated by the address translation circuitry. The lookup in the page walker cache 100 will result in a hit if any sequential most significant portions of the first address hit in the cache. Therefore, there will be a cache hit if the most significant N-bit portion of the virtual address hits in the page walker cache 100. There will also be a hit if the two most significant N-bit portions of the virtual address hit in the page walker cache 100. There will also be a hit if the three most significant N-bit portions of the virtual address hit in the page walker cache. Finally, there will also be a hit if the four most significant N-bit portions of the virtual address hit in the page walker cache. In this way the page walker cache can determine multiple hits for a single virtual address. Where there are multiple hits in the page walker cache 100, the address translation circuitry is configured to use the most specific match, i.e., the hit that matches the most N-bit portions of the virtual address.

If the lookup in the page walker cache 100 misses, then the address translation circuitry performs the address translation by performing the maximum predetermined number of sequential lookups in page table levels. In this case the page walker cache 100 performs the L0 level lookup 102, the L1 level lookup 104, the L2 level lookup 106 and the L3 level lookup 108 in order to determine the physical address.

If the best hit in the page walker cache 100 matches only the most significant N-bit portion of the virtual address, then the address translation circuitry does not need to perform the L0 lookup as the result of this lookup can be retrieved from the page walker cache. Hence, the address translation circuitry performs the L1 lookup 104, the L2 lookup 106 and the L3 lookup 108 in order to determine the physical address.

If the best hit in the page walker cache 100 matches the two most significant N-bit portions of the virtual address, then the address translation circuitry does not need to perform the L0 lookup or the L1 lookup as the result of these lookups can be retrieved from the page walker cache. Hence, the address translation circuitry performs the L2 lookup 106 and the L3 lookup 108 in order to determine the physical address.

If the best hit in the page walker cache 100 matches the three most significant N-bit portions of the virtual address, then the address translation circuitry does not need to perform the L0 lookup, the L1 lookup or the L2 lookup as the result of these lookups can be retrieved from the page walker cache. Hence, the address translation circuitry performs only the L3 lookup 108 in order to determine the physical address.

FIG. 13 schematically illustrates the use of the page walker cache 100 to perform an address translation. The address translation circuitry 40 receives a first address to be translated to a second address. The address translation circuitry performs an initial lookup of the first address in the page walker cache 100. The lookup in the page walker cache 100 determines whether any most significant portions of the first address match entries of the page walker cache 100. The most significant 9 bits of the first address 102 are determined to hit in the page walker cache 100 and result in a returned page walker cache entry 104. The address translation circuitry 40 is therefore able to suppress the L0 lookup and proceed directly to the next level lookup based on the returned page walker cache entry 104. The page walker cache entry 104 provides a base address for the next level lookup and size information (NL set to 1) indicating that the next level lookup is a lookup in one of the large page tables. Hence, the address translation circuitry 40 determines that the next level lookup is the L1/L2 lookup in the (L1/L2) page table level. The address translation circuitry performs this lookup and determines an entry in the (L1/L2) page table level based on 18-bits of the first address (bits 38 down to 21). The result of the L1/L2 level lookup is an address of the L3 lookup and size information that indicates that the L3 level lookup is a lookup in a regular page table. The address translation circuitry 40 performs the L3 lookup in the (L3) page table using 9 bits of the first address (bits 20 down to 12). The result of the L3 level lookup is used, in combination with the final 12 bits of the first address to generate the second address.

FIG. 14 schematically illustrates the interpretation of a large page table 106 by a legacy configuration. The large page table 106 is a region memory that is occupied by $2^M$ contiguous regular page tables. Hence, legacy translation circuitry can be used to perform a page table walk to translate a first address to a second address by performing a page table walk in which each page table is treated as a regular page table. The large page table 106 is aligned to a boundary between regions of $2^{N*M}$ entries in memory. Hence, each of the contiguous regular page tables that are included in the large page table is aligned to a boundary between regions of $2^N$ entries. As a result, an entry of the preceding page table level 108 can be used to determine a particular region of the large page table 106. The legacy address translation therefore performs the initial L0 lookup based on the most significant portion of the first address and determines that the next lookup, the L1 lookup, is the regular page table 108. The legacy address translation circuitry performs the lookup in the regular page table 108 using index bits 38 down to 30 of the first address to determine a particular regular page table from the contiguous regular page tables that form the large page table 106. The particular regular page table of the large page table 106 is then used to perform the L2 level lookup based on bits 29 down to 21 of the first address. The page table walk then continues to perform the L3 lookup and to output the second address based on this information. The same translation could be performed by the address translation circuitry 40 according to the present techniques by combining the L1 level lookup and the L2 level lookup as a single L1/L2 level lookup in which bits 38 down to 21 of the first address are used to index into the large page table 106, thereby performing a single L1/L2 level lookup rather than two lookups (one L1 level lookup and one L2 level lookup). In such configurations, an (L0) level page table entry would be cached that is different to the (L0) level page table entry that is used by the legacy configuration. The legacy (L0) level page table entry points to the legacy L1 page table. In contrast the (L0) level page table entry to be used by the address translation circuitry 40 points to the combined L1/L2 page table. Hence, the legacy configuration is provided with a different (L0) level page table entry to the address translation circuitry 40.

FIGS. 15a and 15b schematically illustrate the translation of a first address to a second address by a legacy configuration (FIG. 15a) and by the address translation circuitry according to the present techniques (FIG. 15b) when a large page table level 112 is provided with a preceding legacy configuration region 110 embedded within the large page table. In FIG. 15a, the legacy address translation circuitry receives a first address and performs an L0 level lookup based on the L0 index portion (bits 47 down to 39) of the first address. The L0 level lookup returns a base address for the L1 level lookup which points to the legacy configuration region 110 which is embedded within the large page table 112. The legacy address translation circuitry is ignorant of the large page table and accesses the legacy configuration region as though it is a regular page table as part of the L1 level lookup using the L1 indexing bits of the first address (bits 38 down to 30). The L1 level lookup in the legacy configuration region 110 returns an address of a particular regular page table sized region of the large page table 112 which is used for the L2 level lookup. The L2 level lookup is performed in the particular region of the regular page table sized region of the large page table 112 using the L2 indexing bits of the first address (bits 29 down to 21). The L2 level lookup returns an address of a regular page table which is used in combination with the L3 indexing bits (bits 20 down to 12) of the first address to perform the L3 lookup. The result of the L3 level lookup is combined with the least significant bits of the first address (bits 11 down to 0) to generate the second address.

FIG. 15b schematically illustrates the performance of the address translation circuitry 40 according to the present techniques. The address translation circuitry 40 receives a first address and performs an L0 level lookup based on the L0 index portion of the first address (bits 47 down to 39). The first address in this case is the same as the first address used in the legacy configuration. The result of the L0 level lookup is the base address of the legacy configuration region 110 of the large page table 112 and size information (NL set to 1) that indicates that the next level lookup is a lookup in a large page table. Because a large page table is aligned to a boundary between regions of size $2^{N*M}$ and a regular page table is aligned to a boundary between regions of size $2^N$, the most significant portion of the base address to the legacy configuration region 110 is also the base address of the large page table 112. Hence, by using the L1/L2 indexing portion of the of the first address in combination with the base address determined from the (L0) level lookup, the address translation circuitry 40 is able to index directly into the large page table 112. Therefore, the address translation circuitry performs the next level lookup, the L1/L2 level lookup, in the large page table 112 using the L1/L2 indexing bits (bits 38 down to 21) of the first address which points to a particular entry of the (L1/L2) page table level. The address translation circuitry 40 checks that the L1/L2 indexing bits do not point to the legacy configuration region 110 of the large page table 112 before proceeding to perform the lookup. The result of the L1/L2 level lookup returns an address of a regular page table, which is used in combination with the L3 indexing bits (bits 20 down to 12) of the first address to perform the L3 lookup, and size information that indicates that the L3 level lookup is a regular level lookup. The result of the L3 level lookup is combined with the least significant bits of the first address (bits 11 down to 0) to generate the second address.

FIG. 16 schematically illustrates a sequence of steps performed by the address translation circuitry when performing an intermediate lookup. Flow begins at step S100, where the address translation circuitry begins the intermediate lookup in a current intermediate page table. Flow then proceeds to step S102, where the address translation circuitry retrieves, from the current intermediate page table, information indicative of a sequentially next lookup address of a sequentially next page table. Flow then proceeds to step S104, where the address translation circuitry retrieves, from the current intermediate page table, page table size information indicative of a size of the sequentially next page table. Flow then proceeds to step S106, where it is determined whether performing the sequentially next lookup will exceed the predetermined maximum number of lookups. If, at step S106, it is determined that performing the next lookup will not exceed the predetermined maximum number of lookups then flow proceeds to step S108, where the current intermediate lookup is ended and, subsequently, a next lookup (either another intermediate level lookup or a final level lookup) is begun. If, at step S106, it was determined that performing the sequentially next lookup will exceed the predetermined maximum number of lookups then flow proceeds to step S110, where subsequent lookups are suppressed and the address translation circuitry generates the second address based on the information indicative of the sequentially next lookup address.

FIG. 17 schematically illustrates a set of steps carried out by the address translation circuitry in response to receiving a first address in order to generate a second address. Flow begins at step S200, where the address translation circuitry receives a first address and indication of first size information. At step S200 the address translation circuitry also sets a counter j equal to 1. Flow then proceeds to step S202, where it is determined if the $j^{th}$ page table is a large page table. If, at step S202, it is determined that the $j^{th}$ page table is not a large page table then flow proceeds to step S212, where the address translation circuitry identifies the entry in the $j^{th}$ page table using a single N-bit portion of the first address. Flow then proceeds to step S206. If, at step S202, it was determined that the $j^{th}$ page table is a large page table, then flow proceeds to step S204. At step S204 the address translation circuitry identifies the entry in the $j^{th}$ page table using M sequential N-bit portions of the first address. Flow then proceeds to step S206. At step S206 the address translation circuitry retrieves, from the entry in the $j^{th}$ page table, information indicative of the $(j+1)^{th}$ lookup address of the $(j+1)^{th}$ page table and $(j+1)^{th}$ page table size information indicative of a size of the $(j+1)^{th}$ page table.

Flow then proceeds to step S208, where it is determined if the $(j+1)^{th}$ size information indicates that the next lookup would cause a total number of lookups to exceed the predetermined number of lookups. In particular, the size of a current lookup is known from steps S202, S204, and S212. Hence, the total number of lookups that would be required to perform the sequentially next lookup can be determined from the information on the size of the current $(j^{th})$ lookup and the information that is returned as size information from the $j^{th}$ lookup. If, at step S208, it is determined that performing the $(j+1)^{th}$ lookup would exceed the predetermined number of lookups then flow proceeds to step S210. At step S210 the address translation circuitry suppresses any subsequent lookups and generates the second address based on information indicative of the $(j+1)^{th}$ lookup address. If, at step S208, it is determined that performing the $(j+1)^{th}$ lookup would not exceed the predetermined number of lookups then flow proceeds to step S214.

At step S214 it is determined if the $j^{th}$ page table is a large page table. If, at step S214, it is determined that the $j^{th}$ page table is not a large page table, then flow proceeds to step S222 where the current lookup is counted as (deemed to be) a single lookup. Flow then proceeds to step S224 where j is incremented by 1 before flow returns to step S202. If, at step S214, it is determined that the $j^{th}$ page table is a large page table then flow proceeds to step S216. At step S216 the address translation circuitry determines whether the $(j+1)^{th}$ lookup address corresponds to an address of the $j^{th}$ page table. If, at step S216, it is determined that the $(j+1)^{th}$ lookup address corresponds to the address of the $j^{th}$ page table, then flow proceeds to step S222 where the current lookup is counted as (deemed to be) a single lookup. Flow then proceeds to step S224 where j is incremented by 1 before flow returns to step S202. If, at step S216, it is determined that the $(j+1)^{th}$ lookup address does not corresponds to the address of the $j^{th}$ page table, then flow proceeds to step S218 where the current lookup is counted as (deemed to be) M lookups. Flow then proceeds to step S220. At step S220 j is incremented by M before flow returns to step S202.

In brief overall summary there is provided address translation circuitry and a method for performing address translation. The address translation circuitry is responsive to receipt of a first address to perform an address translation between the first address and a second address by performing a predetermined maximum number of sequential lookups. The address translation circuitry is configured to support regular page tables comprising $2^N$ entries and large page tables comprising $2^{N*M}$ entries. The address translation circuitry is configured to: perform an intermediate lookup to: retrieve information indicative of a sequentially next lookup address and page table size information and, when the page table size information indicates that the sequentially next lookup corresponds to one of the large page table and performing the sequentially next lookup would exceed the predetermined maximum number of sequential lookups, suppress subsequent lookups and generate the second address based on the information indicative of the sequentially next lookup address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Address translation circuitry responsive to receipt of a first address to perform an address translation between the first address and a second address by performing a predetermined maximum number of sequential lookups in a plurality of page table levels,
   wherein the address translation circuitry is configured to:
      support regular page table levels comprising $2^N$ entries and large page table levels comprising $2^{N*M}$ entries, wherein each sequential lookup in a regular page table level is deemed to be a single level lookup of the predetermined maximum number of sequential lookups and each sequential lookup in a large page table level is deemed to be M level lookups of the predetermined maximum number of sequential lookups; and
   perform an intermediate lookup to:
   retrieve, from a current intermediate page table level of the plurality of page table levels, i) information indicative of a sequentially next lookup address of a sequentially next page table level and ii) page table level size information indicative of a size of the sequentially next page table level; and
   when the page table level size information indicates that a sequentially next lookup corresponds to one of the large page table levels and that performing the sequentially next lookup would exceed the predetermined maximum number of sequential lookups, suppress subsequent lookups of the predetermined maximum number of sequential lookups and generate the second address based on the information indicative of the sequentially next lookup address.

2. The address translation circuitry of claim 1, wherein the first address comprises a sequence of N-bit indexing portions, and the address translation circuitry is configured to:
   index each sequential lookup in one of the regular page table levels using a single N-bit indexing portion of the sequence of N-bit indexing portions; and index each sequential lookup in one of the large page table levels using M sequential N-bit indexing portions of the sequence of N-bit indexing portions.

3. The address translation circuitry of claim 2, wherein when the page table level size information indicates that performing the sequentially next lookup would be within the predetermined maximum number of lookups and when the sequentially next lookup address corresponds to an address of the current intermediate page table level, the intermediate lookup is deemed, independent of a current size of the current intermediate page table level, to be a single level lookup of the predetermined maximum number of sequential lookups.

4. The address translation circuitry of claim 2, wherein the address translation circuitry is configured to, in response to a control bit indicating that an intermediate entry is to be treated as the single level lookup, deem the intermediate lookup to be the single level lookup of the predetermined maximum number of sequential lookups independent of a current size of the current intermediate page table level.

5. The address translation circuitry of claim 3, wherein when the sequentially next lookup address corresponds to the address of the current intermediate page table level and the intermediate lookup corresponds to one of the large page table levels:
the intermediate lookup is indexed using a current M sequential portions of the sequence of N-bit indexing portions; and
a least significant M minus 1 sequential N-bit indexing portions of the current M sequential indexing portions are a most significant M minus 1 sequential N-bit indexing portions of a sequentially next M sequential indexing portions to be used to index the sequentially next lookup.

6. The address translation circuitry of claim 2, further configured to:
recognize a legacy configuration region within one of the large page table levels, the legacy configuration region comprising $2^N$ entries identifying sequentially next lookup address corresponding to an address of the current intermediate page table level; and
when the M sequential N-bit indexing portions point to the legacy configuration region of $2^N$ entries, generate a legacy configuration table fault.

7. The address translation circuitry of claim 1, wherein the address translation circuitry is configured to, when the page table level size information indicates that performing the sequentially next lookup would exceed the predetermined maximum number of sequential lookups by an amount greater than one, output an invalid translation fault.

8. The address translation circuitry of claim 1, further comprising storage circuitry to store i) information indicative of a sequentially first page table level address corresponding to a first intermediate lookup of the predetermined maximum number of sequential lookups and ii) first size information indicative of a size of the first page table level.

9. The address translation circuitry of claim 8, wherein:
the storage circuitry stores information indicative of a plurality page table level addresses; and
the address translation circuitry is configured to select the sequentially first page table level address from the plurality of page table level addresses based on one or more selection bits of the first address.

10. The address translation circuitry of claim 9, wherein the address translation circuitry is configured to select the sequentially first page table level address from the plurality of page table level addresses further based on a current privilege level.

11. The address translation circuitry of claim 1, further comprising partial translation storage circuitry to associate intermediate lookup information retrieved during the intermediate lookup with a corresponding subset of bits of the first address already used in the address translation, the intermediate lookup information comprising i) information indicative of the sequentially next lookup address and the ii) information indicative of the size of the sequentially next page table level.

12. The address translation circuitry of claim 11, further configured to:
perform a partial translation lookup in the partial translation storage circuitry based on the first address; and
when the partial translation lookup hits in the partial translation storage circuitry, retrieve the information indicative of the sequentially next lookup address and the information indicative of the size of the sequentially next page table level from the partial translation storage circuitry, and suppress lookups associated with the corresponding subset of bits of the first address already used in the address translation.

13. The address translation circuitry of claim 1, wherein the first address is defined in a first address space and the second address is defined in a second address space.

14. The address translation circuitry of claim 13, wherein each of the first address space and the second address space is one of:
a virtual address space;
an intermediate physical address space; and
a physical address space.

15. A method for performing, in response to receipt of a first address, an address translation between the first address and a second address by performing a predetermined maximum number of sequential lookups in a plurality of page table levels comprising regular page table levels comprising $2^N$ entries and large page table levels comprising $2^{N*M}$ entries, wherein each sequential lookup in a regular page table level is deemed to be a single lookup of the predetermined maximum number of sequential lookups and each sequential lookup in a large page table level is deemed to be M lookups of the predetermined maximum number of sequential lookups, the method comprising performing an intermediate lookup by:
retrieving from a current intermediate page table level of the plurality of page table levels, i) information indicative of a sequentially next lookup address of a sequentially next page table level and ii) page table level size information indicative of a size of the sequentially next page table level; and
suppressing, in response to the page table level size information indicating i) that a sequentially next lookup corresponds to one of the large page table levels and ii) that performing the sequentially next lookup would exceed the predetermined maximum number of sequential lookups, subsequent lookups of the predetermined maximum number of sequential lookups and generate the second address based on the information indicative of the sequentially next lookup address.

* * * * *